US012302315B2

(12) United States Patent
Ibrahim et al.

(10) Patent No.: US 12,302,315 B2
(45) Date of Patent: May 13, 2025

(54) UPLINK CONTROL INFORMATION MULTIPLEXING FOR PHYSICAL UPLINK SHARED CHANNEL REPETITIONS IN FULL DUPLEX

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Gokul Sridharan, Sunnyvale, CA (US); Ahmed Attia Abotabl, San Diego, CA (US); Hung Dinh Ly, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/684,994

(22) Filed: Mar. 2, 2022

(65) Prior Publication Data

US 2023/0284212 A1 Sep. 7, 2023

(51) Int. Cl.
*H04L 5/14* (2006.01)
*H04L 1/08* (2006.01)
(Continued)

(52) U.S. Cl.
CPC ........... *H04W 72/1268* (2013.01); *H04L 1/08* (2013.01); *H04L 5/14* (2013.01); *H04W 72/0446* (2013.01); *H04W 72/21* (2023.01); *H04W 72/569* (2023.01)

(58) Field of Classification Search
CPC ......... H04W 72/1268; H04W 72/0446; H04W 72/21; H04W 72/569; H04L 1/08;
(Continued)

(56) References Cited

U.S. PATENT DOCUMENTS

2020/0137745 A1* 4/2020 Bachu ............... H04W 72/0453
2021/0329660 A1* 10/2021 Zhang ............... H04W 72/1268
(Continued)

OTHER PUBLICATIONS

Lenovo, et al., "Full Duplex Cell Operation in NR", RWS-210397, 3rd Generation Partnership Project, Mobile Competence Centre, 650, Route Des Lucioles, F-06921 Sophia-Antipolis Cedex, France, vol. TSG RAN, No. Electronic Meeting, Jun. 28, 2021-Jul. 2, 2021, Jun. 7, 2021, 5 Pages, XP052025950, p. 2-p. 3.
(Continued)

*Primary Examiner* — Syed Ali
(74) *Attorney, Agent, or Firm* — Patterson & Sheridan, LLP

(57) ABSTRACT

Certain aspects of the present disclosure provide techniques for multiplexing uplink control information on physical uplink shared channels in full duplex mode. An example method that may be performed by a UE includes: receiving scheduling information from a network entity, wherein: the scheduling information schedules, in a first full duplex (FD) slot of a plurality of slots, transmission of a first uplink (UL) data channel repetition of a plurality of UL data channel repetitions and uplink control information (UCI), and the FD slot comprises an UL subband for UL transmissions and a downlink (DL) subband for DL transmissions, multiplexing the first UL data channel repetition with the UCI to form a multiplexed transmission, and transmitting the multiplexed transmission in the FD slot.

24 Claims, 17 Drawing Sheets

(51) Int. Cl.
*H04W 72/0446* (2023.01)
*H04W 72/1268* (2023.01)
*H04W 72/21* (2023.01)
*H04W 72/566* (2023.01)

(58) Field of Classification Search
CPC ... H04L 5/0053; H04L 1/1664; H04L 5/1461; H04L 5/14
See application file for complete search history.

(56) References Cited

U.S. PATENT DOCUMENTS

| | | | | |
|---|---|---|---|---|
| 2022/0167404 | A1* | 5/2022 | Park | H04W 16/14 |
| 2023/0198725 | A1* | 6/2023 | Abdelghaffar | H04B 7/0626 |
| | | | | 370/252 |
| 2023/0209483 | A1* | 6/2023 | Rudolf | H04W 56/0045 |
| | | | | 370/503 |
| 2023/0269776 | A1* | 8/2023 | Abedini | H04W 74/0808 |
| | | | | 370/252 |
| 2023/0276438 | A1* | 8/2023 | Rudolf | H04W 52/146 |
| 2023/0354300 | A1* | 11/2023 | Abotabl | H04L 5/0051 |

OTHER PUBLICATIONS

NTT Docomo, et al., "Email Discussion Summary for [RAN-R18-WS-CrossFunc-NTT_DOCOMO]", 3GPP TSG RAN Rel-18 workshop, RWS-210634, 3rd Generation Partnership Project, Mobile Competence Centre, 650, Route Des Lucioles, F-06921 Sophia-Antipolis Cedex, France, vol. RAN WG3, No. Electronic Meeting, Jun. 28, 2021-Jul. 2, 2021, Jun. 25, 2021, pp. 1-19, XP052029084, p. 14, paragraph 6.2.1—p. 15.

Partial International Search Report—PCT/US2023/063160—ISA/EPO—Jun. 7, 2023.
CATT: "Remaining Issues on PUSCH Enhancements", R1-2000529, 3GPP TSG RAN WG1 #100, 3rd Generation Partnership Project, Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020, XP052343591, 12 Pages, Paragraph [02.5], figure 1.
Futurewei: "UE Initiated COT For Semi-static Channel Access", R1-2110878, 3GPP TSG RAN WG1 Meeting #107-e, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 5, 2021, XP052074067, 7 Pages, p. 3.
Huawei, et al., "Corrections on PUSCH Enhancement", R1-2001549, 3GPP TSG RAN WG1 Meeting #100bis-e, 3rd Generation Partnership Project, Mobile Competence Centre, 650, Route Des Lucioles, F-06921 Sophia-Antipolis Cedex, France, vol. RAN WG1, No. E-meeting, Apr. 20, 2020-Apr. 30, 2020, Apr. 11, 2020, XP052341633, 10 Pages, paragraph [2.4.2].
Intel Corporation: "Further Details for Enabling URLLC/IIoT in Unlicensed Band", R1-2109606, 3GPP TSG RAN WG1 Meeting #106-bis-e, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, XP052058549, 20 Pages, p. 11.
International Search Report and Written Opinion—PCT/US2023/063160—ISA/EPO—Jul. 26, 2023.
ZTE Corporation: "Discussion on Unlicensed Band URLLC/IIoT", R1-2110396, 3GPP TSG RAN WG1 #106bis-e, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 6, 2021, XP052059637, 8 Pages, p. 4.

* cited by examiner

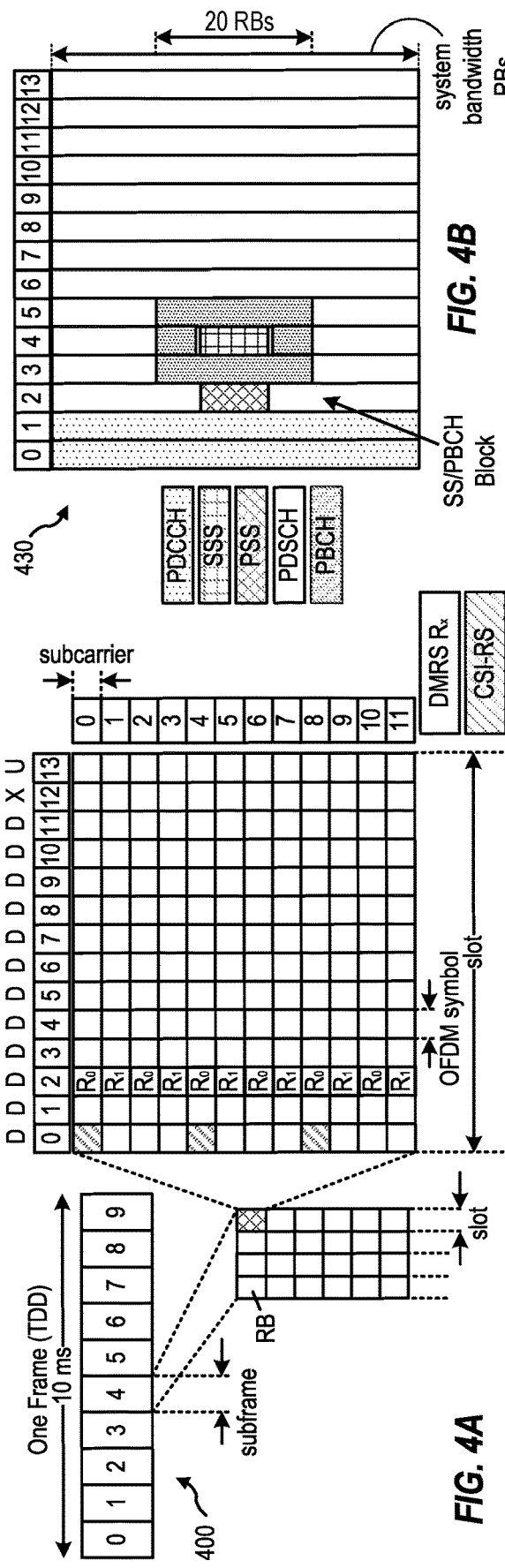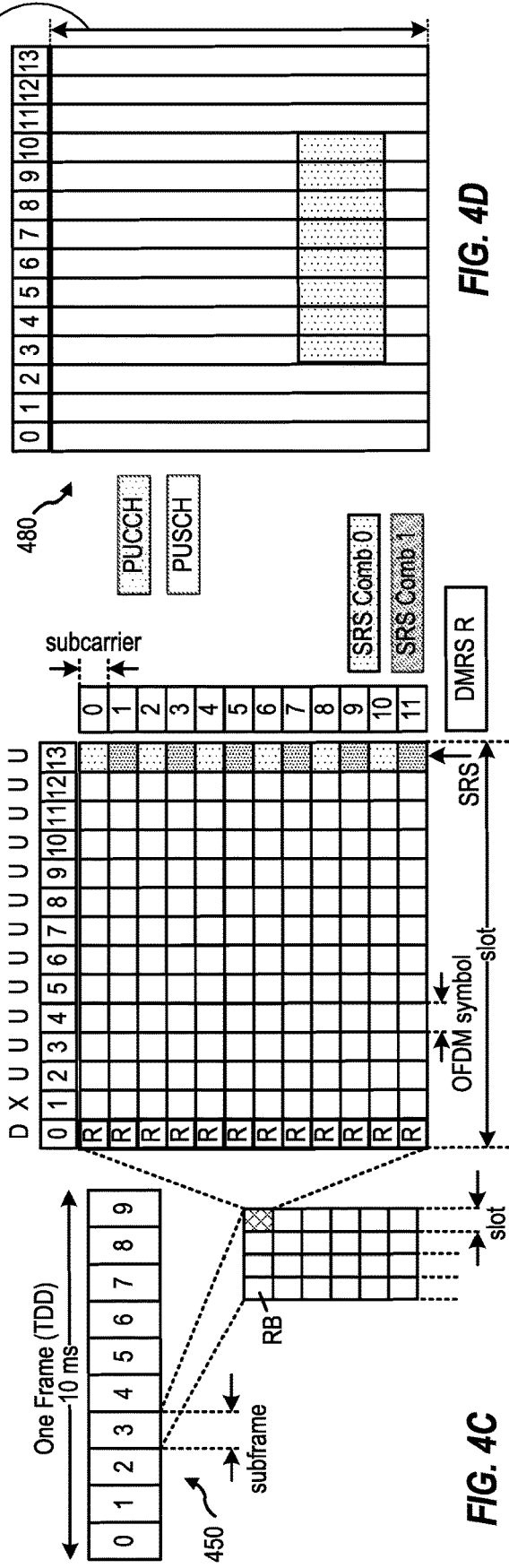

1400

A METHOD FOR WIRELESS COMMUNICATION BY A NETWORK ENTITY

1402

TRANSMIT SCHEDULING INFORMATION TO A USER EQUIPMENT (UE), WHEREIN:
THE SCHEDULING INFORMATION SCHEDULES, IN A FIRST FULL DUPLEX (FD) SLOT OF A PLURALITY OF SLOTS, TRANSMISSION OF A FIRST UPLINK (UL) DATA CHANNEL REPETITION OF A PLURALITY OF UL DATA CHANNEL REPETITIONS AND UPLINK CONTROL INFORMATION (UCI), AND
THE FD SLOT COMPRISES AN UL SUBBAND FOR UL TRANSMISSIONS AND A DOWNLINK (DL) SUBBAND FOR DL TRANSMISSIONS

1404

RECEIVE A MULTIPLEXED TRANSMISSION IN THE FD SLOT, THE MULTIPLEXED TRANSMISSION COMPRISING THE FIRST UL DATA CHANNEL REPETITION AND THE UCI

1406

DEMULTIPLEX THE UCI FROM THE MULTIPLEXED TRANSMISSION

*FIG. 14*

UPLINK CONTROL INFORMATION MULTIPLEXING FOR PHYSICAL UPLINK SHARED CHANNEL REPETITIONS IN FULL DUPLEX

BACKGROUND

Field of the Disclosure

Aspects of the present disclosure relate to wireless communications, and more particularly, to techniques for multiplexing uplink control information on physical uplink shared channels in full duplex.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE). The method generally includes: receiving scheduling information from a network entity, wherein: the scheduling information schedules, in a first full duplex (FD) slot of a plurality of slots, transmission of a first uplink (UL) data channel repetition of a plurality of UL data channel repetitions and uplink control information (UCI), and the FD slot comprises an UL subband for UL transmissions and a downlink (DL) subband for DL transmissions; multiplexing the first UL data channel repetition with the UCI to form a multiplexed transmission; and transmitting the multiplexed transmission in the FD slot.

Another aspect provides a method for wireless communication by a user equipment (UE). The method generally includes: receiving scheduling information from a network entity, wherein: the scheduling information schedules transmission of a first uplink (UL) data channel repetition of a plurality of UL data channel repetitions and uplink control information (UCI), and the first UL data channel repetition is scheduled to extend across a slot boundary between a first slot of a plurality of slots and a second slot of the plurality of slots such that a first portion of the first UL data channel repetition is scheduled to occur in the first slot and a second portion of the first UL data channel repetition is scheduled to occur in the second slot; taking one or more actions related to multiplexing the UCI with the first UL data channel repetition, and transmitting, based on the one or more actions related to the multiplexing, at least the first UL data channel repetition.

Another aspect provides a method for wireless communication by a network entity. The method generally includes: transmitting scheduling information to a user equipment (UE), wherein: the scheduling information schedules, in a first full duplex (FD) slot of a plurality of slots, transmission of a first uplink (UL) data channel repetition of a plurality of UL data channel repetitions and uplink control information (UCI), and the FD slot comprises an UL subband for UL transmissions and a downlink (DL) subband for DL transmissions; receiving a multiplexed transmission in the FD slot, the multiplexed transmission comprising the first UL data channel repetition and the UCI; and demultiplexing the UCI from the multiplexed transmission.

Another aspect provides a method for wireless communication by a network entity. The method generally includes: transmitting scheduling information to a user equipment (UE), wherein: the scheduling information schedules transmission of a first uplink (UL) data channel repetition of a plurality of UL data channel repetitions and uplink control information (UCI), and the first UL data channel repetition is scheduled to extend across a slot boundary between a first slot of a plurality of slots and a second slot of the plurality of slots such that a first portion of the first UL data channel repetition is scheduled to occur in the first slot and a second portion of the first UL data channel repetition is scheduled to occur in the second slot; receiving a multiplexed transmission in the first slot or the second slot, the multiplexed transmission comprising at least the first UL data channel repetition and the UCI; and demultiplexing the UCI from the multiplexed transmission.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communication network.

FIG. 14 depicts a method for wireless communication.

DETAILED DESCRIPTION

Aspects of the present disclosure provide apparatuses, methods, processing systems, and computer-readable mediums for multiplexing uplink control information (UCI) on physical uplink shared channels (PUSCHs) in full duplex (FD) mode.

Sub-band full duplex (SBFD) refers to wireless communications in which simultaneous uplink (UL) and downlink (DL) transmissions may occur on a sub-band of the communications bandwidth during certain periods. In full duplex (FD) mode, UL FD resources in SBFD slots may be smaller than frequency resources of legacy uplink slots (also referred to herein as U slots). UEs sometimes transmit one or more duplicates of a physical uplink shared channel (PUSCH), referred to herein as PUSCH repetition(s), in response to control signals from the network (e.g., a downlink control information (DCI) from a network entity). The PUSCH repetition may improve the reliability of the communication from the UE. It may be desirable for a UE transmitting with PUSCH repetition in a system implementing SBFD to adapt some transmissions to the changing FD resources across uplink and SBFD slots.

Aspects of the present disclosure provide techniques for a UE operating in an SBFD communications systems to adapt the multiplexing of uplink control information (UCI) with a physical uplink shared channel (PUSCH). In some aspects of the present disclosure, a UE may determine whether and how much UCI to drop when multiplexing UCI with a PUSCH in slots or symbols in FD mode. In some aspects, a UE may determine in which slots or symbols to multiplex UCI with a PUSCH based on whether the PUSCH is scheduled to be transmitted in a slot or symbol in FD mode. In some aspects of the present disclosure, a UE may split UCI so that a first portion of UCI is transmitted with a first repetition of a PUSCH and a second portion of UCI is transmitted with a second repetition of the PUSCH.

Adapting the multiplexing of UCI with PUSCH in a FD communications system, as described herein, may improve the latency of the communications system, as a UE implementing the described techniques may transmit UCI more quickly and more reliably than in previously known techniques of operating in an FD communications system.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

Figure 1:
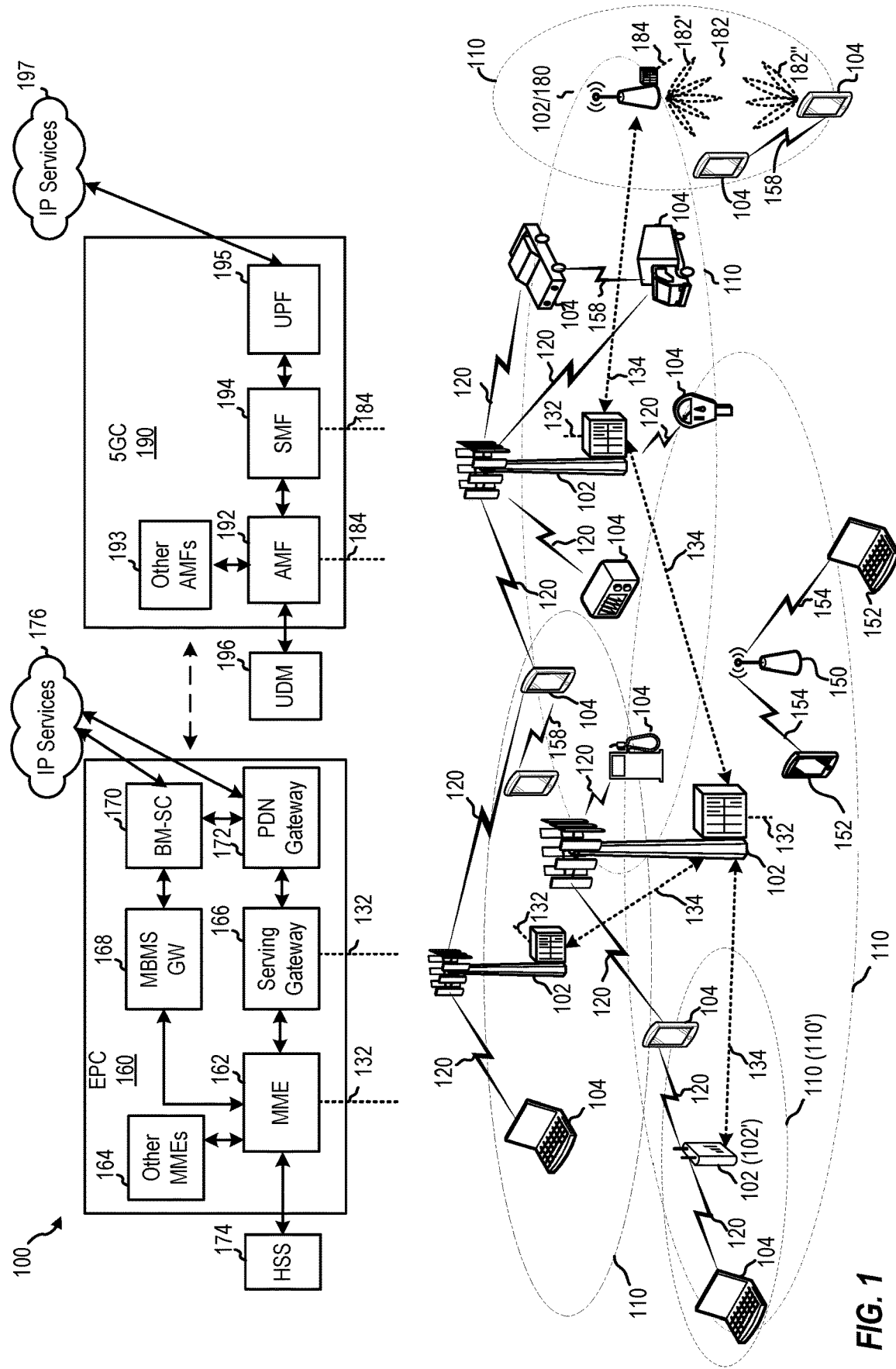
FIG. 1 depicts an example wireless communication network.

FIG. 1 depicts an example of a wireless communication network 100, in which aspects described herein may be implemented.

Generally, wireless communication network 100 includes various network entities (alternatively, network elements or network nodes), which are generally logical entities associated with, for example, a communication device and/or a communication function associated with a communication device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
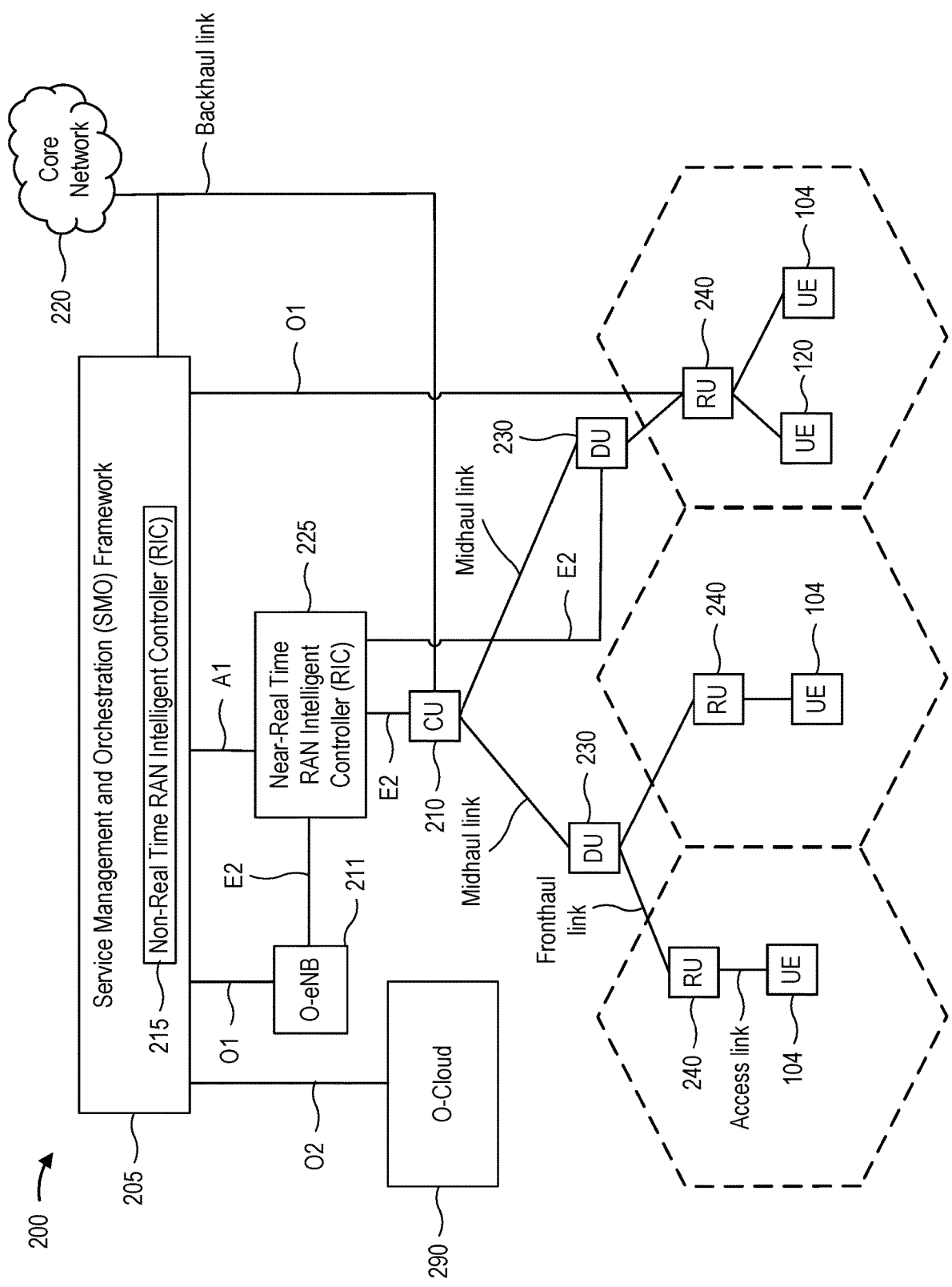
FIG. 2 depicts an example disaggregated base station architecture.

While BSs 102 are depicted in various aspects as unitary communication devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G new radio (NR) or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the base station 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT MC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
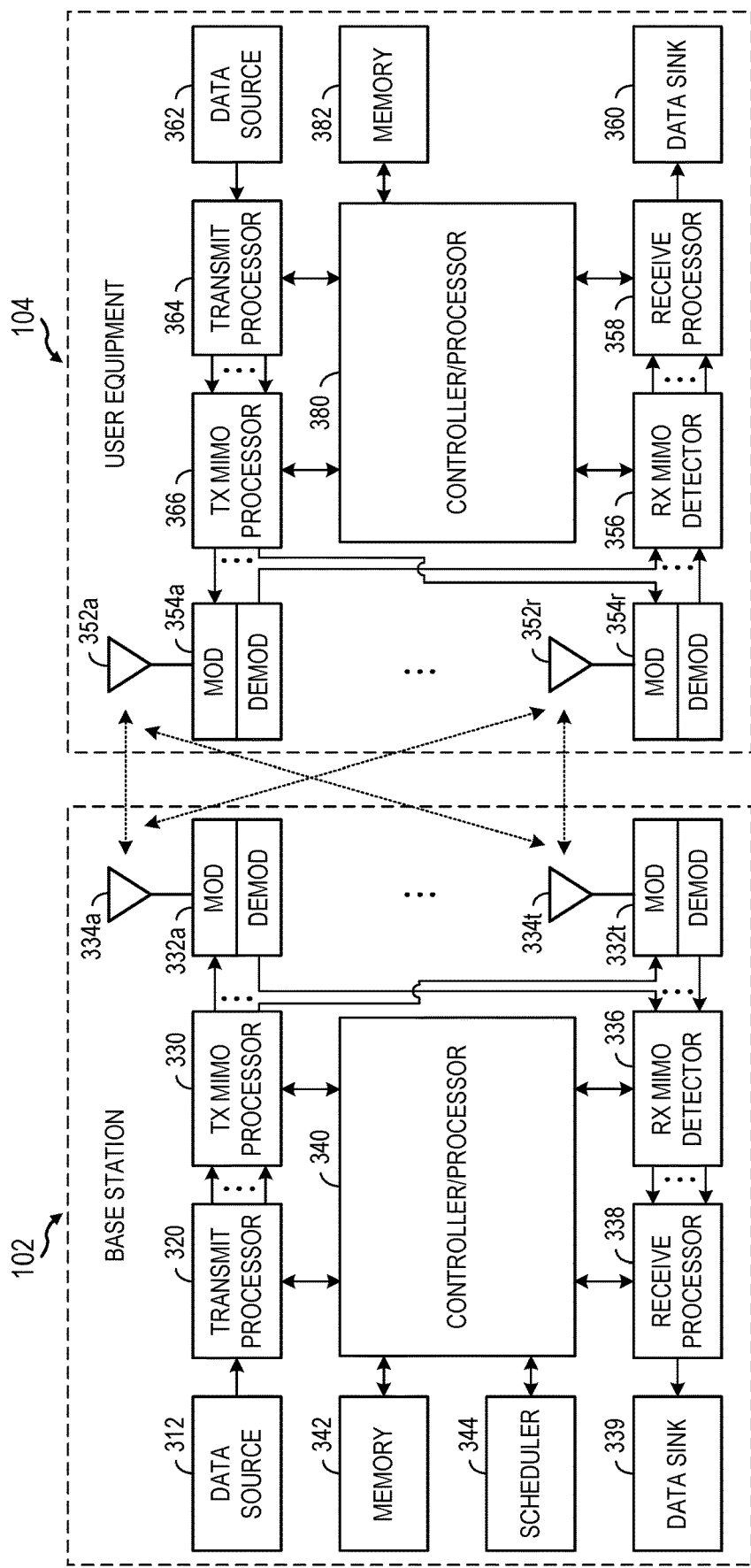
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a*-*t* (collectively 334), transceivers 332*a*-*t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a*-*r* (collectively 352), transceivers 354*a*-*r* (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a*-*t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a*-*t*, antenna 334*a*-*t*, and/or other aspects described herein. Similarly, "receiving" may refer to various mechanisms of obtaining data, such as obtaining data from antennas 334*a*-*t*, transceivers 332*a*-*t*, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic retransmission request (HARQ) ACK/NACK feedback. The PUSCH carries data, and may additionally be used to carry a buffer status report (BSR), a power headroom report (PHR), and/or UCI.

Aspects Related to Multiplexing UCI on PUSCHs in FD Mode

Figure 5A:
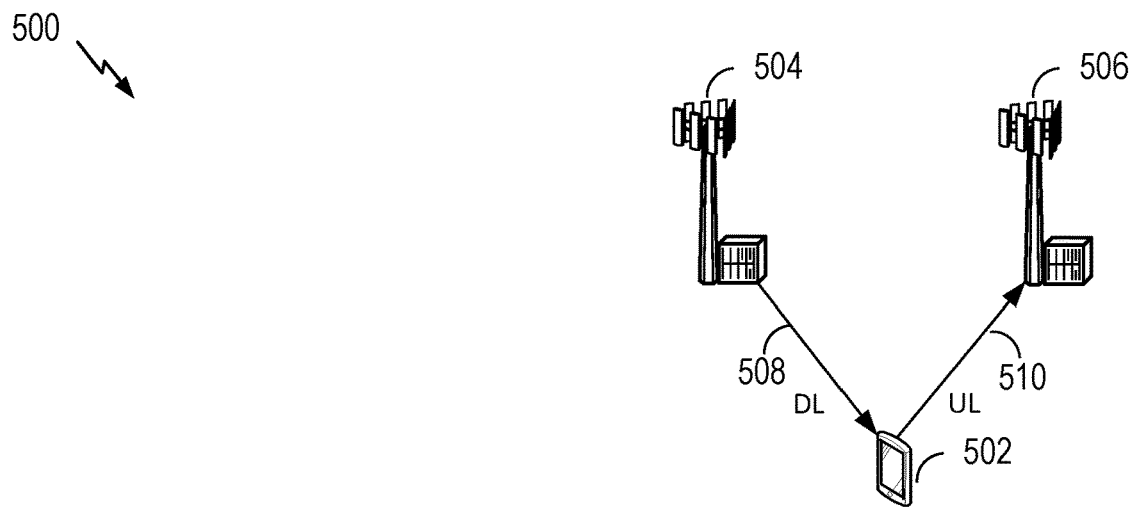
FIGS. 5A, 5B, and 5C illustrate different FD use cases within a wireless communication network
Figure 5B:
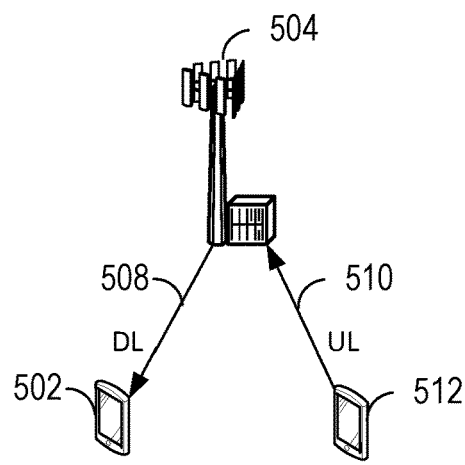
Figure 5C:
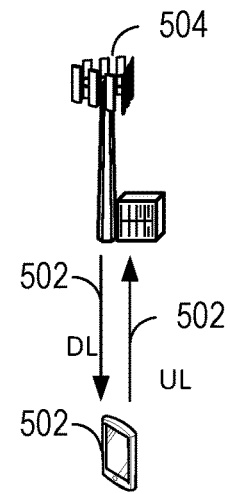

FIGS. 5A, 5B, and 5C illustrates different FD use cases within a wireless communication network, such as the wireless communication network 100. For example, FIG. 5A illustrates a first FD use case involving transmission between one UE 502 and two base stations (or multiple transmission reception points (mTRP)), BS 504 and BS 506. In some cases, UE 502 may be representative of UE 104 of FIG. 1 and BSs 504, 506 may be representative of BS 102 of FIG. 1. As shown, the UE 502 may simultaneously receive DL transmissions 508 from the BS 506 and transmit UL transmissions 510 to the BS 506. In some cases, the DL transmissions 508 and UL transmissions 510 may be performed using different antenna panels to facilitate the simultaneous transmission and reception.

A second FD use case is illustrated in FIG. 5B involving two different UEs and one BS. As illustrated, the UE 502 may receive DL transmissions 508 from the BS 504 while another UE 512 may simultaneously transmit UL transmission 510 to the BS 504. Thus, in this example, BS 504 is conducting simultaneous uplink and downlink communications.

A third FD use case is illustrated in FIG. 5C involving one BS and one UE. As illustrated, the UE 502 may receive DL transmissions 508 from the BS 504 and may simultaneously transmit UL transmissions 510 to the BS 504. As noted above, such simultaneous reception/transmission by the UE 502 may be facilitated by different antenna panels.

Table 1, below, illustrates various example scenarios in which each of the FD use cases may be used.

TABLE 1

| Base Station | UE | FD use case |
|---|---|---|
| FD disabled | FD disabled | Baseline 5G behavior |
| FD disabled | FD enabled | Use case #1 (FIG. 5A) for mTRP |
| FD enabled | FD disabled | Use case #2 (FIG. 5B) + R-16 IAB |
| FD enabled | FD enabled | Use case #3 (FIG. 5C) |

As shown, if FD capability is disabled at both the base station and UE, the baseline 5G behavior may be used (e.g., half-duplex (HD) communication). If FD capability is disabled at the BS but enabled at the UE, the UE may operate according to the first example FD use case shown in FIG. 5A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 5B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 5C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by a guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

In some cases, a user equipment (UE) may be scheduled to transmit uplink data on a physical uplink shared channel (PUSCH). A base station (BS) may schedule uplink transmissions on the PUSCH by transmitting downlink control information (DCI) to the UE that includes a dynamic grant (DG) or may transmit or radio resource control (RRC) signaling to the UE that includes a configured grant (CG).

DGs may include an indication of one or more time and frequency resources for transmitting an uplink transmission on the PUSCH. In some cases, the one or more time and frequency resources may be non-periodic and may be allocated to the UE for a particular uplink transmission. As such, when another uplink transmission needs to be scheduled for the UE, the BS may transmit another dynamic grant with additional scheduling information for this other uplink transmission. Conversely, CGs allocate a periodic set of time and frequency resources to the UE, which may be shared with multiple other UEs. For example, a base station may transmit a CG that allocates the resources to multiple UEs, and the UEs may randomly utilize the resources when they have data to transmit.

In some situations, a UE may have uplink (UL) control information (UCI) to transmit when the UE is scheduled to transmit a PUSCH. In such cases, the UE may multiplex the UCI with other data in the PUSCH transmission. When multiplexing UCI and PUSCH, the UE may be configured with a parameter, $\beta_{offset}$, which is a maximum value for the proportion of the REs allocated for the PUSCH that may be utilized for conveying the UCI on the PUSCH.

Both a dynamic and semi-static $\beta_{offset}$ indication may be used. A semi-static $\beta_{offset}$ indication may be applied by a network using fallback DCI for UL assignment, in which case, sets of $\beta_{offset}$ with fallback DCI are reused for HARQ-ACK and CSI transmissions using CGs. Semi-static $\beta_{offset}$ values associated with a semi-static $\beta_{offset}$ indication may be different from $\beta_{offset}$ values associated with a dynamic $\beta_{offset}$ indication.

A network (e.g., a network entity, such as a base station) may configure sets of $\beta_{offset}$ values using radio resource control (RRC) signalling. Each $\beta_{offset}$ value set may contain a plurality of entries, each corresponding to a UCI type. UCI types may include two-part CSI (e.g., CSI part 1 and CSI part 2) and hybrid automatic repeat request (HARD) acknowledgement (ACK) information. The set of $\beta_{offset}$ values for each UCI may use a set of values provided in legacy systems (e.g., long-term evolution (LTE)) as a basis for determining a set of $\beta_{offset}$ values.

In some cases, when HARQ-ACK information piggybacks on (e.g., is transmitted via) a PUSCH transmitted by a user equipment (UE), three $\beta_{offset}$ values may be defined as one set corresponding to the following cases:

$$O_{ACK} \leq 2,$$

$$[3] \leq O_{ACK} \leq [11], \text{ or}$$

$$O_{ACK} > [11],$$

where $O_{ACK}$ represents the number of HARQ-ACK bits in the PUSCH.

In some cases, when CSI piggybacks on PUSCH transmitted by a UE, four $\beta_{offset}$ values are defined as one set, as seen below. For example, the number of bits for CSI part 1 may be defined as:

$$O_{CSI\_part1} \leq [11], \text{ or}$$

$$O_{CSI\_part1} > [11],$$

while the number of bits for CSI part 2 may be defined as:

$$O_{CSI\_part2} \leq [11], \text{ or}$$

$$O_{CSI\_part2} > [11],$$

where $O_{CSI\_part1}$ represents the number of CSI part 1 bits and $O_{CSI\_part2}$ represents the number of CSI part 2 bits in the PUSCH. When CSI piggybacks on a PUSCH transmitted by a UE, 2 bits in a physical downlink control channel (PDCCH) may dynamically indicate an index to a set of $\beta_{offset}$ values for the PUSCH transmission scheduled by the PDCCH.

If a UE is configured (e.g., by a network entity) with dynamic $\beta_{offset}$ and with non-fallback DCI for UL assignment, four sets of $\beta_{offset}$ values may be configured for HARQ-ACK and CSI respectively. In this case, 2 bits in the non-fallback DCI may indicate one of four sets of $\beta_{offset}$ values.

One table of $\beta_{offset}$ values may be used for HARQ-ACK, while another table of $\beta_{offset}$ values may be used for both CSI parts 1 and 2. Both tables may contain, for example, 32 entries. In an example, the table of $\beta_{offset}$ values for HARQ-ACK may reuse 16 entries from a table used in legacy wireless systems (e.g., LTE table 8.6.3-1 in 36.213). Other entries in this table may be unused and marked reserved. In another example, the table of $\beta_{offset}$ values for both CSI part 1 and CSI part 2 may reuse 16 entries from a table used legacy wireless systems (e.g., LTE table 8.6.3-3 in 36.213), and include additional values 8, 10, 12.625, 15.875, and 20. Other unused entries in this example table may be marked as reserved.

In certain cases, modulated HARQ-ACK symbols may be mapped to REs around demodulation reference signal (DMRS) symbol(s). Modulated HARQ-ACK symbols may be mapped starting on the first, available, non-DMRS, symbol after the first DMRS symbol(s), regardless of the number of DMRS symbols in the PUSCH transmission. CSI part 1 and CSI part 2 may be mapped starting on the first available non-DMRS symbol, regardless of the number of DMRS symbols in the PUSCH transmission.

In a case where a PUSCH is punctured by HARQ-ACK, CSI part 1 may be mapped starting after REs that are reserved for conveying the HARQ-ACK symbols. CSI part 1 information (e.g., bits) may not be mapped on the REs reserved for conveying HARQ-ACK information. CSI part 2 may not be mapped on the REs conveying the CSI part 1 information. CSI part 2 information and PUSCH information may be mapped to the REs reserved for the HARQ-ACK information.

In a case where a PUSCH rate is matched by HARQ-ACK, HARQ-ACK may be mapped first, followed by CSI part 1. CSI part 1 and CSI part 2 may not be mapped on the HARQ-ACK REs.

When scheduled, the UE may transmit uplink data in a transport block (TB) on the PUSCH. In some cases, to improve data transmission coverage of uplink transmissions, the UE may repeat transmission of the TB over multiple slots, known as PUSCH repetition. In some cases, one TB may be transmitted in one slot and multiple copies (e.g., repetitions) of the TB may be transmitted over multiple slots. The multiple copies/repetitions of the TB may be transmitted using different redundancy versions (RVs).

In some aspects, performance may be improved by transmitting one TB over time resources in multiple slots. In other words, a single TB may span across multiple slots, reducing the modulation and coding scheme (MCS) (e.g., code rate) associated with the TB. The reduced code rate results in increased reliability associated with data transmission. Channel coverage may be improved by repeating the same data (possibly with different RVs) in multiple TBs, allowing a receiver (e.g., BS) to combine the TBs for decoding of the data.

Different types of PUSCH repetition may be used, such as PUSCH repetition type-A and PUSCH repetition type-B. Both PUSCH repetition types may be applicable to DG-scheduled and CG-scheduled PUSCHs.

Figure 6A:
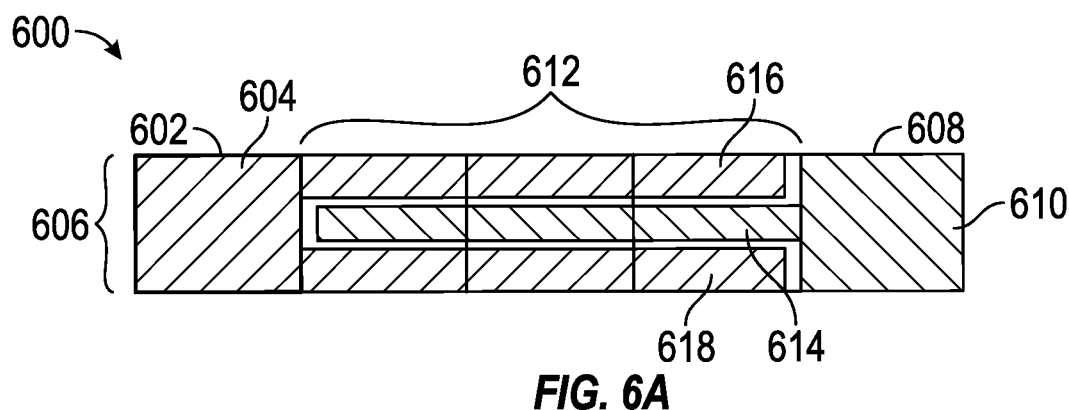
FIGS. 6A and 6B illustrate an example slot format, including at least one subband full duplex slot.
Figure 6B:
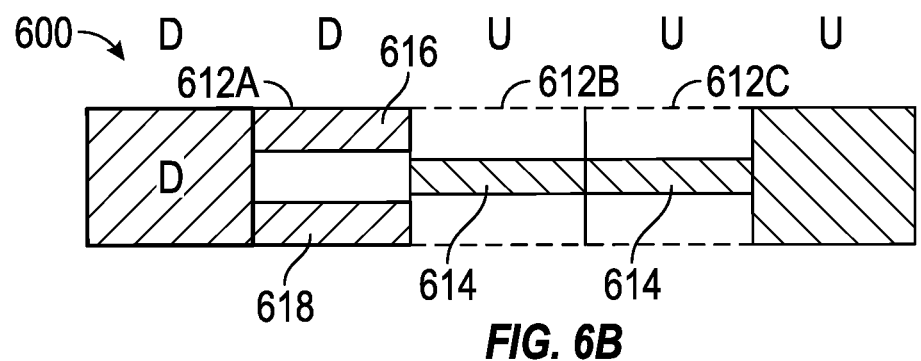

FIGS. 6A and 6B illustrate an example slot format, including at least one sub-band full duplex (SBFD) slot. FIG. 6A is from the perspective of a BS capable of supporting full duplex communication within a slot while FIG. 6B is from the perspective of a UE that is only capable of half duplex communication within a slot.

The slot format 600 of FIG. 6A includes a downlink slot 602 that may be used by the BS to transmit downlink information to the UE. As shown, the downlink slot 602 includes a downlink subband 604 that spans an entire bandwidth part (BWP) 606. Additionally, as shown, the slot format 600 of FIG. 6A includes an uplink slot 608 that may be used by the UE to transmit uplink information to the BS. As shown, the uplink slot 608 includes an uplink subband 610 that spans the entire BWP 606. Further, as shown, the slot format 600 includes a plurality of SBFD slots 612 that may be used by the BS for transmitting downlink information to the UE as well as receiving uplink information from the UE. As shown, each SBFD slot 612 includes an uplink subband 614 that spans only a portion of the BWP 606. Additionally, each SBFD slot 612 includes a downlink subband 616 and a downlink subband 618, each spanning a different portion of the BWP 606. While the uplink subband 614, downlink subband 616, and downlink subband 618 are illustrated as spanning the entire SBFD slot 612, the uplink subband 614, downlink subband 616, and downlink subband 618 within a SBFD slot 612 may be allocated on a symbol-by-symbol granularity.

As noted above, while the BS may be capable of utilizing the slot format 600 illustrated in FIG. 6A for full duplex communication within the SBFD slots 612, the UE, in some cases, may only be capable of half duplex communication with the SBFD slots 612. For example, as illustrated in FIG. 6B, the UE may only be capable of receiving downlink information from the BS via the downlink subbands 616 and 618 within SBFD slot 612A. Similarly, in SBFD slots 612B and 612C, the UE may only be capable of transmitting uplink information to the BS via the uplink subband 614. In some cases, the uplink subband 614 may have a size of less than 50 PRBs, but there may be cases where it may be larger than 50 PRBs.

Figure 7A:
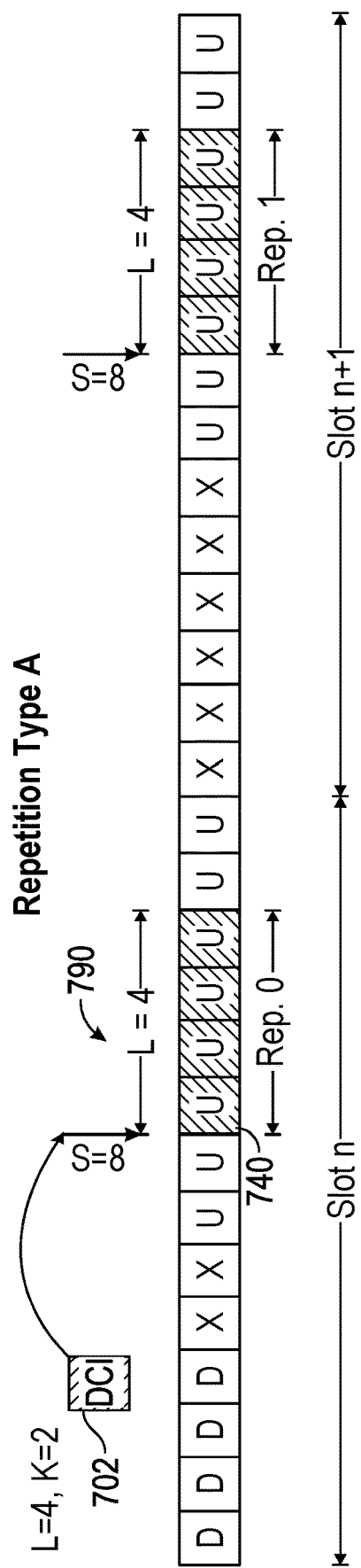
FIGS. 7A and 7B illustrate different examples of physical uplink shared channel (PUSCH) repetition.

FIG. 7A illustrates an example of PUSCH repetition type-A. The symbols shown in FIG. 7A may be either configured for downlink (labeled "D"), configured for uplink (labeled "U"), or configured as a special or flexible symbol (labeled "X") which can be either designated as downlink or uplink. In some cases, a BS may indicate a number of repetitions K to a UE to be applied for PUSCH. If the number of repetitions K is greater than 1, the same start and length indicator (indicated by a start and length indicator value (SLIV)) may be applied across K consecutive slots. SLIV indicates the start symbol and length of PUSCH. For example, DCI 702 may indicate SLIV for PUSCH transmission 790, such as a start symbol 740 (e.g., S=8) with a length L of 4 symbols, as shown in FIG. 7A. As shown, the PUSCH may be transmitted based on the same SLIV in each of the K consecutive slots. For example, repetition 0 of a PUSCH TB may be transmitted in a segment of slot n and repetition 1 of the PUSCH TB may be transmitted in a segment of slot n+1, as shown. As used herein, a segment generally refers to a group of consecutive uplink configured symbols or a group of consecutive downlink configured symbols, as shown in FIG. 7A and FIG. 7B.

A UE may transmit a PUSCH according to a repetition Type B. PUSCH repetition Type B supports nominal repetitions within a slot, and may allow for crossing of a slot boundary. A network my dynamically change a PUSCH repetition Type and a corresponding repetition number using DCI. For repetition Type B, each nominal repetition can be sent back-to-back with the same consecutive symbols.

Figure 7B:
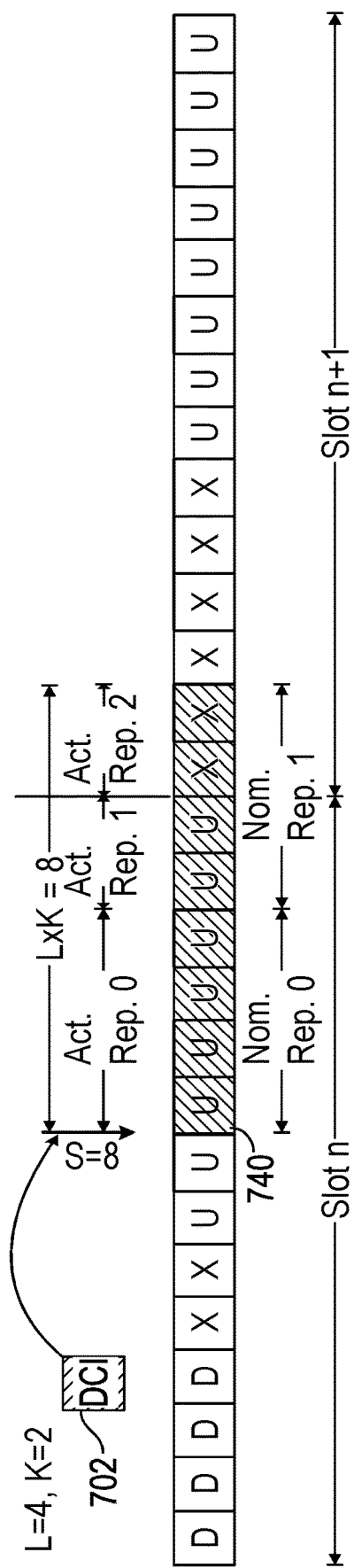

FIG. 7B illustrates an example of PUSCH repetition type-B. The symbols shown in FIG. 7B may be either configured for downlink (labeled "D"), configured for uplink (labeled "U"), or configured as a special or flexible symbol (labeled "X") which can be designated as either downlink or uplink. As shown, the repetitions of a PUSCH TB may be within or across slots. For example, the PUSCH may cross a slot boundary, such as the boundary between slot n and n+1 shown in FIG. 7B.

In some aspects, dynamic indication of a number of repetitions may be implemented. That is, DCI 702 may indicate SLIV for the PUSCH TB repetitions. For example, a start at symbol (S=8) may be indicated with K=2 repetitions, as shown. More generally, DCI 702 may indicate that K nominal repetitions, each with nominal length L, may be sent back-to-back starting from symbol 740 (S=8), where S and L are given by SLIV. Accordingly, as shown in FIG. 7B, repetition 0 may be transmitted in a segment of slot n and repetition 1 may be transmitted in segments of slot n and slot n+1, where the segments are contiguous. Moreover, while FIGS. 7A and 7B have illustrated an example uplink/downlink (U/D) symbol interaction and SLIV configuration to facilitate understanding, any U/D symbol interaction or SLIV configuration may be used. If a nominal repetition crosses slot boundary, as shown with regard to nominal repetition 1 in FIG. 7B, the nominal repetition may include more than one actual repetition. An actual repetition is an actual transmission by the transmitting device (e.g., a UE) and may not be made if the symbols on which the actual repetition occurs are not valid for transmission by the device. For example, if the first two symbols of slot n+1 in FIG. 7B were downlink-only symbols, then the UE would not transmit the actual repetition 2 shown in FIG. 7B, but would instead transmit on the next two symbols available for uplink transmissions (e.g., uplink symbols, labeled "U" in FIG. 7B, or special or flexible symbols, labeled "X" in FIG. 7B).

In certain cases, a UE may transmit both a PUSCH with repetition Type B and a physical uplink control channel (PUCCH) with HARQ-ACK information and/or channel state information (CSI). The PUCCH may be transmitted over a single slot that overlaps with the PUSCH transmission in one or more slots. A UE may expect all actual repetitions of the PUSCH overlapping with the PUCCH transmission to fulfill certain multiplexing conditions for multiplexing the HARQ-ACK and/or CSI information. A UE may multiplex the HARQ-ACK and/or CSI information in the earliest actual PUSCH repetition of the PUSCH transmission that both overlaps with the PUCCH transmission and includes more than one symbol. A UE may not expect a case where all actual repetitions overlapping with the PUCCH transmission do not include more than one symbol.

To calculate a number of coded modulation symbols per layer for a PUSCH with repetition Type B, a $\beta_{offset}$ value may be designated assuming nominal resources. For example, a number of coded modulation symbols per layer for a CSI part 1 transmission may be found according the Equation 1, below. In Equation 1, $M_{actual}(l)$ indicates available REs for symbol 'l'. For CSI part 1 transmission on an actual repetition of a PUSCH with repetition Type B on the uplink shared channel (UL-SCH), the number of coded modulation symbols per layer for CSI part 1 transmission, denoted as $Q'_{CSI-part1}$ or $Q'_{CSI-1}$, is determined as:

$$Q'_{CSI-1} = \min\left\{ \left\lceil \frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \left[\alpha \cdot \sum_{l=0}^{N_{symb,nominal}^{PUSCH}-1} M_{sc,nominal}^{UCI}(l)\right] - Q'_{ACK/CG-UCI}, \right.$$

$$\left. \sum_{l=0}^{N_{symb,actual}^{PUSCH}-1} M_{sc,actual}^{UCI}(l) - Q'_{ACK/CG-UCI} \right\}.$$

(1)

In Equation 1, $O_{CSI-1}$ is the number of bits for CSI part 1. In some cases, if $O_{CSI-1} \geq 360$, then $L_{CSI-1}=11$; otherwise $L_{CSI-1}$ is the number of cyclic redundancy check (CRC) bits determined for CSI part 1. Additionally, in Equation 1, $\beta_{offset}^{PUSCH} \times \beta_{offset}^{CSI-part1}$. Further, $C_{UL-SCH}$ is the number of code blocks for UL-SCH of the PUSCH transmission. In some cases, if the DCI format scheduling the PUSCH transmission includes a code block group transmission information (CBGTI) field indicating that the UE shall not transmit the r-th code block, $K_r=0$; otherwise, $K_r$ is the r-th code block size for UL-SCH of the PUSCH transmission. Further, $M_{sc}^{PUSCH}$ is the scheduled bandwidth of the PUSCH transmission, expressed as a number of subcarriers and $M_{sc}^{PT-RS}(l)$ is the number of subcarriers in OFDM symbol l that carries phase tracking reference signal (PTRS), in the PUSCH transmission. Additionally, in Equation 1, $Q'_{ACK}$ is the number of coded modulation symbols per layer for HARQ-ACK transmitted on the PUSCH if number of HARQ-ACK information bits is more than 2, and $$Q'_{ACK} = \sum_{l=0}^{N^{PUSCH}_{symb,all}-1} \overline{M}^{ACK}_{sc,rvd}(l)$$

if the number of HARQ-ACK information bits is no more than 2 bits, where $\overline{M}^{ACK}_{sc,rvd}(l)$ is the number of reserved resource elements for potential HARQ-ACK transmission in OFDM symbol l, for l=0, 1, 2, ..., $N_{symb,all}^{PUSCH}-1$, in the PUSCH transmission. Further, $M_{sc}^{UCI}(l)$ is the number of resource elements that can be used for transmission of UCI in OFDM symbol l, for l=0, 1, 2, ..., $N_{symb,all}^{PUSCH}-1$, in the PUSCH transmission and $N_{symb,all}^{PUSCH}$ is the total number of OFDM symbols of the PUSCH, including all OFDM symbols used for DMRS. In some cases, for any OFDM symbol that carries DMRS of the PUSCH, $M_{sc}^{UCI}(l)=0$. Additionally, in some cases, for any OFDM symbol that does not carry DMRS of the PUSCH, $M_{sc}^{UCI}(l)=M_{sc}^{PUSCH}-M_{sc}^{PT-RS}(l)$. Further, in Equation 1, α is a scaling factor configured by a higher layer parameter "scaling".

In certain implementations, a UE may restrict resources allowed for UCI. Restriction may be indicated by a scaling or adjustment factor (e.g., α). The scaling or adjustment factor is applied to limit the number of resource elements assigned to UCI on PUSCH scheduled by DCI. In some cases, the scaling factor may not apply to PUSCHs scheduled by DCI format 0_2. Scaling values may be denoted as, for example, "f0p5" corresponding to a scaling factor of 0.5, "f0p65" corresponding to a scaling factor of 0.65, and so on.

In certain implementations, a UE may drop CSI part 2 on a PUSCH with repetition Type B. When a UE is scheduled to transmit a transport block on PUSCH using repetition Type B multiplexed with a CSI report(s), Part 2 CSI may be omitted according to Equation 2, below. For example, CSI part 2 may be omitted when:

$$[(O_{CSI\text{-}2}+L_{CSI\text{-}2})\cdot\beta_{offset}^{PUSCH}\cdot\Sigma_{l=0}^{N_{symb,nominal}^{PUSCH}-1} M_{sc,nominal}^{UCI}(l)/\Sigma_{r=0}^{C_{UL\text{-}SCH}-1}K_r] \text{ is larger than}$$
$$\min\{[\alpha\cdot\Sigma_{l=0}^{N_{symb,nominal}^{PUSCH}-1}M_{sc,nominal}^{UCI}(l)]-Q'_{ACK/CG\text{-}UCI}-Q'_{CSI\text{-}1},\Sigma_{l=0}^{N_{symb,actual}^{PUSCH}-1}M_{sc,actual}^{UCI}(l)-Q'_{ACK/CG\text{-}UCI}-Q'_{CSI\text{-}1}\}.$$

Part 2 CSI may be omitted (from the PUSCH) level by level, beginning with the lowest priority level until reaching a lowest priority level that causes $[(O_{CSI\_2}+L_{CSI\_2})\cdot\beta_{offset}^{PUSCH}\cdot\Sigma_{l=0}^{N_{symb,nominal}^{PUSCH}-1}M_{sc,nominal}^{UCI}(l)\Sigma_{r=0}^{C_{UL\text{-}SCH}-1}K_r]$ to be less than or equal to $\min\{[\alpha\cdot\Sigma_{l=0}^{N_{symb,nominal}^{PUSCH}-1}M_{sc,nominal}^{UCI}(l)]-Q'_{ACK/CG\text{-}UCI}-Q'_{CSI\text{-}1}, \Sigma_{l=0}^{N_{symb,actual}^{PUSCH}-1}M_{sc,actual}^{UCI}(l)-Q'_{ACK/CG\text{-}UCI}-Q'_{CSI\text{-}1}\}$ (i.e., so that Equation 2 is satisfied).

When a UE transmits PUSCH with repetition Type B, the UE may determine invalid symbols for PUSCH with repetition Type B transmission. For repetition Type B, a UE may exclude invalid symbols (e.g., a DL-only symbol) according to a slot format, prior to the transmission of the actual repetition. Invalid symbols for PUSCH with repetition Type B may include DL-only symbols and other symbols that the network (e.g., a network entity) has configured as being invalid for the UE to use for transmitting. The UE may determine symbols as invalid symbols for PUSCH repetition Type B transmission when the symbols are DL symbols semi-statically configured by RRC parameters including tdd-UL-DL-ConfigurationCommon, which is cell-specific, and tdd-UL-DLConfigurationDedicated, which is UE-specific. The UE may also determine symbols as invalid symbols for PUSCH repetition Type B transmission when the symbols are invalid symbols configured by an RRC information element (IE) such as invalidSymbolPattern.

When implementing PUSCH repetition Type B, a UE may receive a DCI that schedules aperiodic CSI report(s). A UE may also receive a DCI that activates semi-persistent CSI report(s) on PUSCH with no transport block indication indicated in a CSI request field of the DCI. When a UE receives a DCI that schedules aperiodic CSI report(s) or activates semi-persistent CSI report(s) on PUSCH with no transport block, the number of nominal repetitions may be assumed by the UE to be one, regardless of the value of numberOfRepetitions indicated by the DCI.

When the UE is scheduled by a DCI to transmit a PUSCH repetition Type B with no transport block and with aperiodic or semi-persistent CSI report(s) as indicated by the CSI request field in the DCI, the first nominal repetition is expected to be the same as the first actual repetition.

In cases where the UE is scheduled to transmit a PUSCH repetition Type B carrying semi-persistent CSI report(s) without a corresponding PDCCH, after CSI reporting is activated on PUSCH by a 'CSI request' field in a DCI received by the UE, if the first nominal repetition is not the same as the first actual repetition (e.g., one or more symbols are invalid for the UE to transmit on), the first nominal repetition may be omitted. Other conditions may also cause the UE to omit the first nominal repetition.

For PUSCH repetition Type B, when a UE is scheduled to transmit a transport block and aperiodic CSI report(s) on PUSCH by the CSI request field on a DCI, the CSI report(s) may be multiplexed only on the first actual repetition. Additional actual repetitions of the PUSCH may convey uplink data and/or other uplink control information. In this case, the UE may not expect that the first actual repetition has a single symbol duration.

In FD mode, UL FD resources (e.g., REs in an UL subband) in SBFD slots may be smaller than frequency resources of legacy uplink slots (also referred to herein as U slots). As discussed above, UEs sometimes transmit one or more duplicates of a PUSCH transmission, referred to herein as PUSCH repetition(s), in response to control signals from the network (e.g., a downlink control information (DCI) from a network entity). The PUSCH repetition may improve the reliability of the communication from the UE.

However, this smaller allocation of frequency resources in SBFD slots as compared to legacy uplink slots may cause issues when determining how to multiplex UCI with PUSCH using the techniques described above. For example, as described above, Equation 1 may be used to determine a number of coded modulation symbols per layer for CSI part 1. However, Equation 1 based on legacy uplink slots and does not take into account that there are a reduced number of frequency resources in SBFD slots. Accordingly, determining the coded modulation symbols according to Equation 1 may, in some cases, lead to a UE determining more coded modulation symbols for the UCI (e.g., CSI) than there are available resources within an SBFD for carrying the UCI. Moreover, the reduced number of frequency resources in SBFD slots may cause issues when determining whether CSI part 2 information needs to be omitted.

Accordingly, aspects of the present disclosure provide techniques for helping to resolve these issues when UCI is multiplexed with PUSCH type A and type B repetitions in systems using both legacy uplink and SBFD slots.

In aspects of the present disclosure, techniques for determining data to multiplex and/or drop/omit when transmitting PUSCHs with type A or type B repetition when the slots in which the repetitions are being transmitted have different amounts of uplink frequency resources in communications systems implementing SBFD. The provided techniques may include determining a factor, β, that may be used to determine a quantity of transmission resources to use for conveying control information in a transmission or a repetition. As used herein, β is an example of an offset factor, as described herein.

Aspects of the present disclosure provide techniques for multiplexing UCI in PUSCHs transmitted in response to CGs and in PUSCHs transmitted in response to DGs.

Example Operations of Entities in a Communication Network

Figure 8:
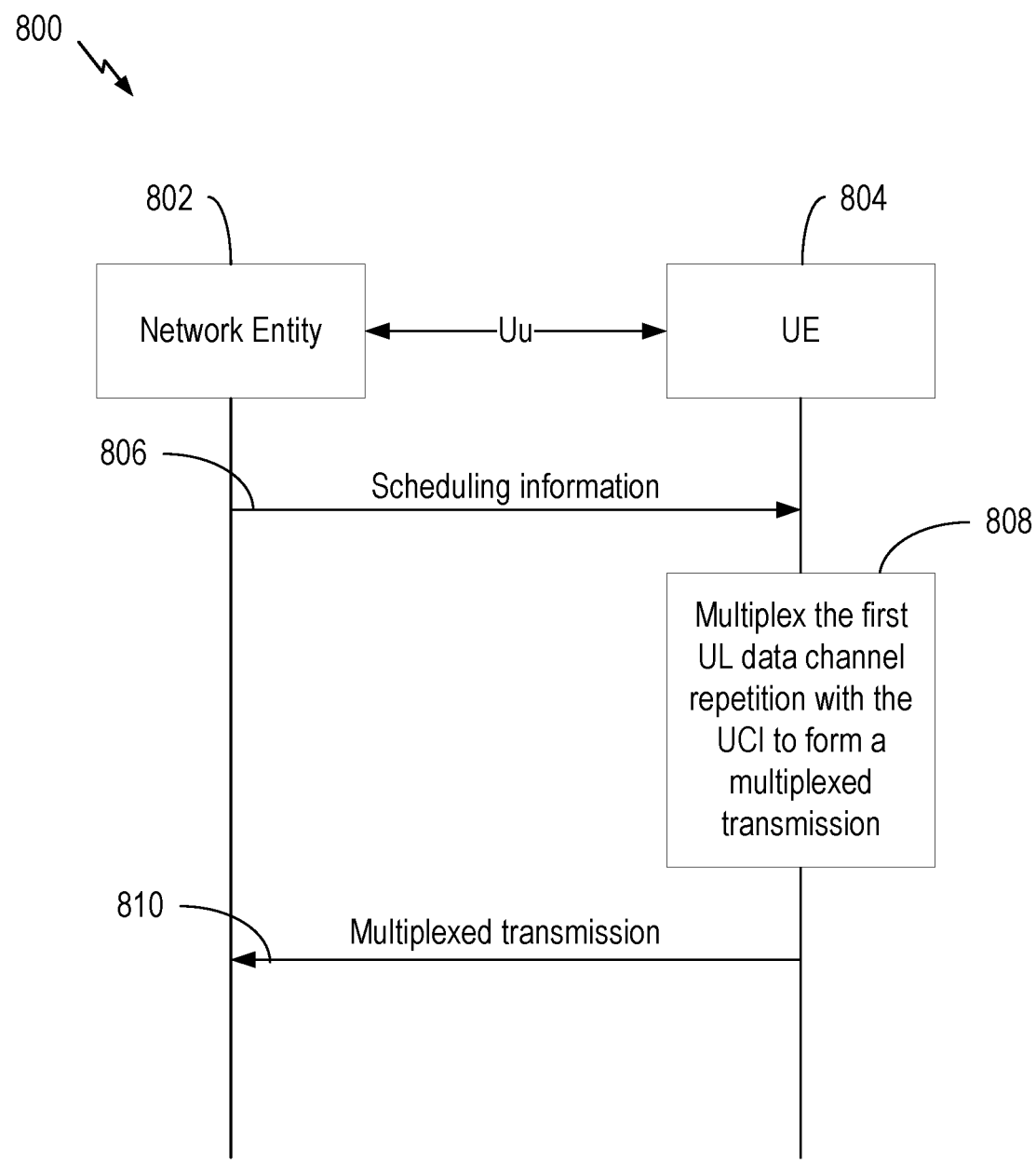
FIG. 8 depicts a process flow for communication in a network between a UE and a network entity.

FIG. 8 depicts a process flow 800 for communication in a network entity 802 and a user equipment (UE) 804. In some aspects, the network entity 802 may be an example of the BS 102 depicted and described with respect to FIGS. 1 and 3 or a disaggregated BS as described with respect to FIG. 2. Similarly, the UE 804 may be an example of UE 104 depicted and described with respect to FIGS. 1 and 3. However, in other aspects, UE 804 may be another type of wireless communication device and network entity 802 may be another type of network entity or network node, such as those described herein. The network entity 802 and the UE 804 may communicate via a Uu interface.

The UE 804 receives, at 806, scheduling information from the network entity 802. The scheduling information schedules, in a first full duplex (FD) slot of a plurality of slots, transmission of a first uplink (UL) data channel repetition of a plurality of UL data channel repetitions and uplink control information (UCI), and the FD slot comprises an UL subband for UL transmissions and a downlink (DL) subband for DL transmissions. In some cases, the first UL data channel repetition may include a PUSCH type A repetition.

At 808, the UE 804 multiplexes the first UL data channel repetition with the uplink control information (UCI) to form a multiplexed transmission.

The UE 804 transmits the multiplexed transmission in the FD slot at 810.

According to aspects of the present disclosure, when the UE 804 is scheduled to transmit a PUSCH with repetition Type A, the UE 804 may calculate a number of coded symbols to use for UCI in a PUSCH in an SBFD slot based on a value of β configured by the network (e.g., a network entity, such as a base station). The UE 804 may then perform the multiplexing in 808 using the calculated number of coded symbols. The variations of β (e.g., $\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, and $\beta_{CSI-2,SBFD}$) described herein are examples of offset values described herein. In such aspects, the number of coded symbols may be further constrained by a total number of available (e.g., configured for uplink transmission and not otherwise invalid) REs in the SBFD slot. Thus, for transmitting CSI part 1 (CSI-1), the number of coded symbols, denoted as $Q'_{CSI-part1}$ or $Q'_{CSI-1}$, may be calculated as:

$$Q'_{CSI-1} = \min\left\{ \left\lceil \frac{(O_{CSI-1} + L_{CSI-1}) \cdot \beta^{PUSCH}_{offset} \cdot \sum_{l=0}^{N^{PUSCH}_{symb,nominal}-1} M^{UCI}_{sc,nominal}(l)}{\sum_{r=0}^{C_{UL-SCH}-1} K_r} \right\rceil, \left\lceil \alpha \cdot \right. \right. \tag{3}$$

-continued $$\left. \sum_{l=0}^{N^{PUSCH}_{symb,nominal}-1} M^{UCI}_{sc,nominal}(l) \right\rceil - Q'_{ACK/CG-UCI},$$

$$\left. \sum_{l=0}^{N^{PUSCH}_{symb,actual}-1} M^{UCI}_{sc,actual}(l) - Q'_{ACK/CG-UCI} \right\}$$

where:
- $M_{sc,nominal}$ represents the number of available REs in a U slot in which a repetition is transmitted; and
- $M_{sc,actual}$ represents the number of available REs in an SBFD slot in which a repetition is transmitted.

As the multiplexing in 808 may be performed using the calculated number of coded symbols, the multiplexing may be considered to be performed based on one or more of the offset values (e.g., β), which may be associated with a non-FD slot of the plurality of slots. Additionally, the multiplexing in 808 may, for example, include determining the number of REs for multiplexing the UCI. In some cases, as the number of REs may be constrained by the total number of REs available in the FD slot (which is related to the UL bandwidth of the slot), the multiplexing in 808 may be further based on a bandwidth associated with the first UL data channel repetition.

Figure 9:
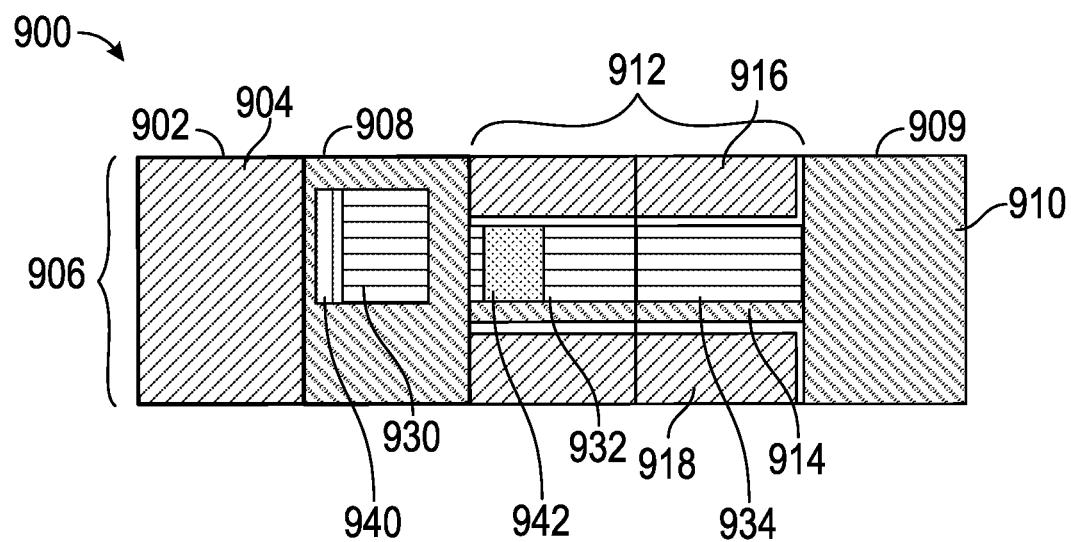
FIG. 9 illustrates an example slot format including at least one SBFD slot, and transmissions by a UE transmitting a PUSCH with type A repetition, in accordance with aspects of the present disclosure.

FIG. 9 illustrates an example slot format 900, including at least one SBFD slot, and transmissions by the UE 804 transmitting a PUSCH with type A repetition, in accordance with aspects of the present disclosure. The slot format 900 of FIG. 9 includes a downlink slot 902 that may be used by the network entity 802 to transmit downlink information to the UE 804. As shown, the downlink slot 902 includes a downlink subband 904 that spans an entire BWP 906. Additionally, as shown, the slot format 900 of FIG. 9 includes uplink slots 908 and 909 that may be used by the UE 804 to transmit uplink information to the network entity 802. As shown, the uplink slots 908 and 909 each includes an uplink subband 910 that spans the entire BWP 906. Further, as shown, the slot format 900 includes a plurality of SBFD slots 912 that may be used by the network entity 802 for transmitting downlink information to the UE 804 as well as receiving uplink information from the UE. As shown, each SBFD slot 912 includes an uplink subband 914 that spans only a portion of the BWP 906. Additionally, each SBFD slot 912 includes a downlink subband 916 and a downlink subband 918, each spanning a different portion of the BWP 906. While the uplink subband 914, downlink subband 916, and downlink subband 918 are illustrated as spanning each of the entire SBFD slots 912, the uplink subband 914, downlink subband 916, and downlink subband 918 within the SBFD slots 912 may be allocated on a symbol-by-symbol granularity.

Time and frequency resources 930, 932, and 934 in the slot format 900 are allocated for PUSCH repetitions. The UE 804 may transmit a nominal repetition 0 of a PUSCH in the time and frequency resources 930, a nominal repetition 1 of the PUSCH in the time and frequency resources 932, and a nominal repetition 2 of the PUSCH in the time and frequency resources 934. UCI that the UE transmits multiplexed with the PUSCH may be conveyed in the time and frequency resources 940. The time and frequency resources 942 may be used for some or all of the UCI, according to aspects of the present disclosure. As previously discussed, the UE 804 multiplexes UCI with a PUSCH in the time and frequency resources 932, the UE 804 may determine the number of REs to use for the UCI (represented at 942) based on the bandwidth of the uplink subband 914 of the slot.

In aspects of the present disclosure, the UE 804 transmitting a PUSCH with repetition Type A may omit (e.g., drop or discard) CSI part 2 instead of multiplexing the CSI part 2 with the PUSCH. When the UE 804 is scheduled to transmit a transport block on PUSCH using repetition Type A multiplexed with a CSI report(s), CSI part 2 may be omitted when $[(O_{CSI-2}+L_{CSI-2}) \cdot \beta_{offset}^{PUSCH} \cdot \Sigma_{l=0}^{N_{symb,nominal}^{PUSCH}-1} M_{sc,nominal}^{UCI}(l) / \Sigma_{r=0}^{C_{UL-SCH}-1} K_r]$ is larger than $\min\{[\alpha \cdot \Sigma_{l=0}^{N_{symb,nominal}^{PUSCH}-1} M_{sc,nominal}^{UCI}(l)] - Q'_{ACK/CG-UCI} - Q'_{CSI-1}, \Sigma_{l=0}^{N_{symb,actual}^{PUSCH}-1} M_{sc,actual}^{UCI}(l) - Q'_{ACK/CG-UCI} - Q'_{CSI-1}\}$ (i.e., CSI part 2 is omitted so that Equation 2, above, is satisfied.

More generally, the UE 804 may omit at least a portion of a first type (e.g., CSI part 2) of information in the UCI, instead of multiplexing that portion with a PUSCH, when the PUSCH is scheduled for an FD slot and the UL subband of the FD slot does not include enough REs for the portion of the first type of information. In aspects of the present disclosure, when omitting a portion of a first type of information in the UCI, the omitting may be performed based on a priority level associated with the first type of information. For example, CSI part 2 information may be omitted starting from a lowest level and proceeding level by level, until a priority level is reached wherein the number of REs required for conveying the remaining levels of CSI part 2 information is less than or equal to the number of REs available for the CSI part 2 information (i.e., the priority level which causes $[(O_{CSI-2}+L_{CSI-2}) \cdot \beta_{offset}^{PUSCH} \cdot \Sigma_{l=0}^{N_{symb,nominal}^{PUSCH}-1} M_{sc,nominal}^{UCI}(l) / \Sigma_{r=0}^{C_{UL-SCH}-1} K_r]$ to be less than or equal to $\min\{[\alpha \cdot \Sigma_{l=0}^{N_{symb,nominal}^{PUSCH}-1} M_{sc,nominal}^{UCI}(l)] - Q'_{ACK/CG-UCI} - Q'_{CSI-1}, \Sigma_{l=0}^{N_{symb,actual}^{PUSCH}-1} M_{sc,actual}^{UCI}(l) - Q'_{ACK/CG-UCI} - Q'_{CSI-1}\}$, as previously described).

In aspects of the present disclosure, the UE 804 transmitting a PUSCH with repetition Type A may calculate a number of coded symbols to use for UCI in a PUSCH in an SBFD slot based on a value of β that is dependent on the type of UCI and on whether the UCI is being transmitted in a U slot or an SBFD slot. For example, the network entity 802 may configure sets of values $\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, and $\beta_{CSI-2,SBFD}$, which are examples of offset values described herein. In such aspects, the number of coded symbols 'Q' that may be used in UL or SBFD slots may be calculated according to the equations described herein by using the corresponding values of β, and the multiplexing in 808 may be performed based on the calculated number of coded symbols and thus on the type of UCI and on the type of slot. The set of values $\beta_{HARQ-ACK,U}$, $\beta_{CSI-1,U}$, $\beta_{CSI-2,U}$ for non-FD slots may be greater than, less than, or equal to the corresponding values for FD slots, $\beta_{HARQ-ACK,SBFD}$, $\beta_{CSI-1,SBFD}$, and $\beta_{CSI-2,SBFD}$. For example, if the UE 804 has CSI part 1 to transmit in an SBFD slot, then the UE may set $\beta_{offset}^{PUSCH} = \beta_{CSI-1,SBFD}$ and calculate the number of coded symbols for transmission of the CSI part 1 according to the previously described equation:

$$Q'_{CSI-part1} = \min\left\{\left\lceil\frac{(O_{CSI-1}+L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r}\right\rceil, \left\lceil\alpha \cdot\right.\right. \quad (4)$$

$$\left.\sum_{l=0}^{N_{symb,nominal}^{PUSCH}-1} M_{sc,nominal}^{UCI}(l)\right\rceil - Q'_{ACK/CG-UCI},$$

$$\left.\sum_{l=0}^{N_{symb,actual}^{PUSCH}-1} M_{sc,actual}^{UCI}(l) - Q'_{ACK/CG-UCI}\right\}.$$

In some aspects, the UE can also be configured with two scaling or adjustment factors, $\alpha_U$ and $\alpha_{SBFD}$, with $\alpha_U$ used in the Equation 4 above to determine the number of coded symbols for transmission of the UCI in a U slot and $\alpha_{SBFD}$ used in the Equation 4 above to determine the number of coded symbols for transmission of the UCI in a SBFD slot. As previously described, adjustment factors such as $\alpha_U$ and $\alpha_{SBFD}$ may be used to limit the number of resource elements assigned to UCI on PUSCH for PUSCHs scheduled by DCI formats other than DCI format 0_2.

According to aspects of the present disclosure, the herein-described sets of values of β [$\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, $\beta_{CSI-2,SBFD}$] may be configured to the UE 804 via RRC signaling, or a subset of the values may be configured via RRC signaling, and the UE may receive information, in a DCI, that may be used by the UE to determine others of the values. The scheduling information received by the UE at 806 may include, for example, the information received in the DCI. When the UE 804 is transmitting a configured grant type1 (CG-1) PUSCH, the UE does not receive a DCI scheduling the PUSCH, and the UE may be configured via RRC signaling with all of the herein-described sets of values of ft. The scheduling information received by the UE at 806 may include, for example, the information received via the RRC signaling.

In aspects of the present disclosure, a subset of the herein-described sets of values of β [$\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, $\beta_{CSI-2,SBFD}$] may be configured on the UE 804 via RRC signaling, and the UE may receive information, in a DCI, that may be used by the UE to determine others of the values. The scheduling information received by the UE at 806 may include, for example, the information received in the DCI. When the UE 804 is transmitting a configured grant type2 (CG-2) PUSCH or a DG PUSCH, the DCI (i.e., the DCI, which may be an example of the scheduling information received by the UE at 806, that triggers or schedules the PUSCH) received by the UE may indicate a value for one or more of [$\beta_{HARQ-ACK,U}$, $\beta_{CSI-1,U}$, $\beta_{CSI-2,U}$] and the UE may follow a set of rules for deriving values of [$\beta_{HARQ-ACK,SBFD}$, $\beta_{CSI-1,SBFD}$, $\beta_{CSI-2,SBFD}$] from the value(s) [$\beta_{HARQ-ACK,U}$, $\beta_{CSI-1,U}$, $\beta_{CSI-2,U}$] indicated in the DCI. The scheduling information received by the UE at 806 may include, for example, the configured grant for the CG-2 PUSCH or the DCI.

According to aspects of the present disclosure, a subset of the herein-described sets of values of β [$\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, $\beta_{CSI-2,SBFD}$] may be received in a DCI by a UE, and the UE may be configured (e.g., via RRC signaling) with a set of one or more delta values that the UE can use to calculate others of the values. The DCI may, for example, convey the scheduling information received by the UE at 806. When the UE 804 is transmitting a configured grant type2 (CG-2) PUSCH or a DG PUSCH, the DCI (i.e., the DCI that triggers or schedules the PUSCH) received by the UE may indicate a value for one or more of [$\beta_{HARQ-ACK,U}$, $\beta_{CSI-1,U}$, $\beta_{CSI-2,U}$] and the UE may calculate values of [$\beta_{HARQ-ACK,SBFD}$, $\beta_{CSI-1,SBFD}$, $\beta_{CSI-2,SBFD}$] based on deltas configured on the UE via, for example, RRC signaling. The scheduling information received by the UE at 806 may include, for example, the configured grant for the CG-2 PUSCH or the DCI.

In aspects of the present disclosure, the herein-described sets of values of β [$\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, $\beta_{CSI-2,SBFD}$] may be indicated to the UE 804 via a DCI. The DCI may, for example, convey the scheduling information received by the UE at 806. For example, a format of a DCI may include additional bits in the $\beta_{OFFSET}$ field (e.g., four or six bits, instead of two bits) or additional fields, and the additional bits or fields may indicate a set of values for [$\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, $\beta_{CSI-2,SBFD}$]. In another example, the UE 804 may be configured with a mapping from values of $\beta_{OFFSET}$ to values for $\beta_U$ and $\beta_{SBFD}$, such that the UE 804 receiving a DCI that indicates $\beta_{OFFSET}$ interprets the same field as indicating values for [$\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, $\beta_{CSI-2,SBFD}$]. The table below shows an example of mapping indicators for $\beta_{OFFSET}$ to indices to values for [$\beta_{HARQ-ACK,U}$, $\beta_{CSI-1,U}$, $\beta_{CSI-2,U}$, $\beta_{HARQ-ACK,SBFD}$, $\beta_{CSI-1,SBFD}$, $\beta_{CSI-2,SBFD}$]:

| $\beta_{OFFSET}$ indicator | ($I_{offset,0}^{HARQ-ACK}$ or $I_{offset,1}^{HARQ-ACK}$ or $I_{offset,2}^{HARQ-ACK}$), ($I_{offset,0}^{CSI-1}$ or $I_{offset,0}^{CSI-2}$), ($I_{offset,1}^{CSI-1}$ or $I_{offset,1}^{CSI-2}$) |
|---|---|
| 00 | $1^{st}$ offset index provided by higher layers |
| 01 | $2^{nd}$ offset index provided by higher layers |
| 10 | $3^{rd}$ offset index provided by higher layers |
| 11 | $4^{th}$ offset index provided by higher layers |

Figure 10:
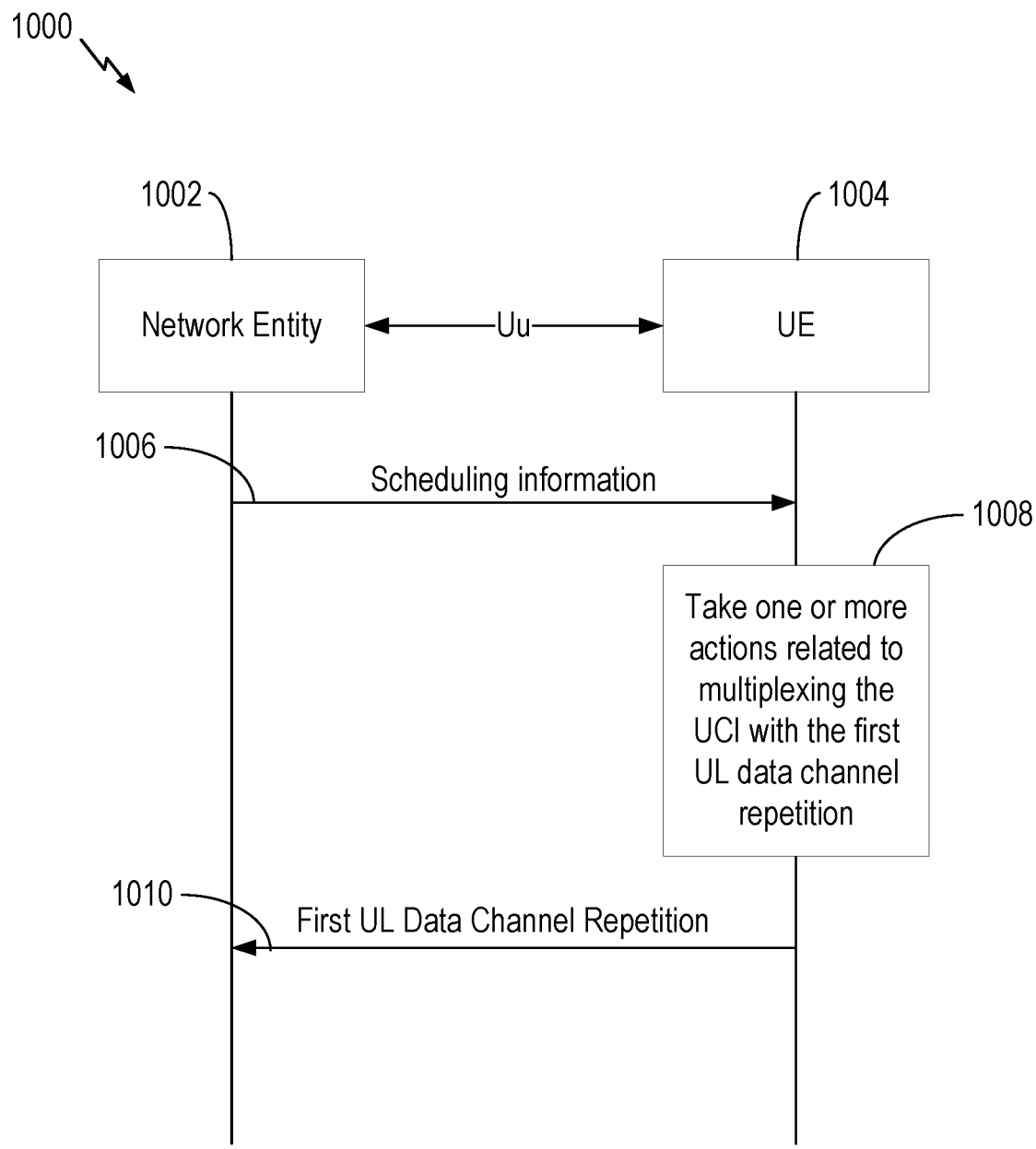
FIG. 10 depicts a process flow for communication in a network between a UE and a network entity.

FIG. 10 depicts a process flow 1000 for communication in a network between a network entity 1002 and a user equipment (UE) 1004. In some aspects, the network entity 1002 may be an example of the BS 102 depicted and described with respect to FIGS. 1 and 3 or a disaggregated BS as described with respect to FIG. 2. Similarly, the UE 1004 may be an example of UE 104 depicted and described with respect to FIGS. 1 and 3. However, in other aspects, UE 1004 may be another type of wireless communication device and network entity 1002 may be another type of network entity or network node, such as those described herein. The network entity 1002 and the UE 1004 may communicate via a Uu interface.

The UE 1004 receives, at 1006, scheduling information from the network entity 1002. The scheduling information schedules transmission of a first uplink (UL) data channel repetition of a plurality of UL data channel repetitions and uplink control information (UCI), and the first UL data channel repetition is scheduled to extend across a slot boundary between a first slot of a plurality of slots and a second slot of the plurality of slots such that a first portion of the first UL data channel repetition is scheduled to occur in the first slot and a second portion of the first UL data channel repetition is scheduled to occur in the second slot. In aspects of the present disclosure, the UL data channel repetitions may be referred to as nominal repetitions, and the portions of the UL data channel repetition may be referred to as actual repetitions. In some cases, the UL data channel repetition may comprise a PUSCH Type B repetition.

At 1008, the UE 1004 takes one or more actions related to multiplexing the UCI with the first UL data channel repetition.

The UE 1004 transmits, based on the one or more actions related to the multiplexing, at least the first UL data channel repetition at 1010.

According to aspects of the present disclosure, the UE 1004 transmitting a PUSCH with repetition Type B may determine how much, if any, UCI data to multiplex with the PUSCH on the first actual repetition based on the bandwidth available for transmission of the PUSCH during the first actual repetition. Determining how much UCI data to multiplex with the PUSCH on the first actual repetition based on the bandwidth available for transmission of the PUSCH during the first actual repetition is an example of the UE taking one or more actions at 1008.

In previously known techniques, the UE 1004 transmitting a PUSCH with repetition multiplexes UCI with the PUSCH on the first actual repetition having a length greater than 1 symbol.

In aspects of the present disclosure, when the UE 1004 transmits a PUSCH with repetition Type B and the first actual repetition is in a non-FD slot (e.g., a U slot), then the UE 1004 may multiplex UCI with the PUSCH on that first actual repetition, but if the first actual repetition is in an SBFD slot, then the UE 1004 may determine whether to multiplex the UCI on that first repetition based on the available bandwidth of the first actual repetition being greater than a threshold proportion of the bandwidth of a nominal repetition in a U slot or based on a total number of available resources for the UCI. Thus, the taking one or more actions at 1008 may be based on the slot type associated with the first slot in which the first portion of the first UL data channel repetition is scheduled being the non-FD slot (e.g., SBFD slot).

Figure 11A:
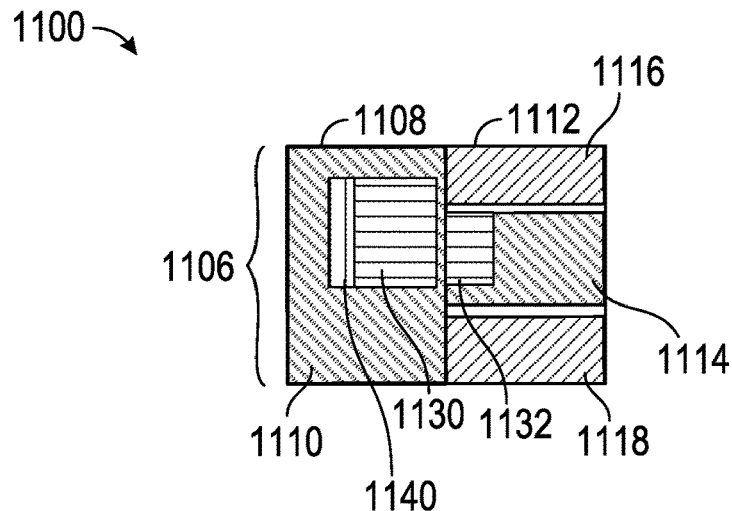
FIGS. 11A, 11B, and 11C illustrate an example slot format including an SBFD slot and transmissions by a UE transmitting a PUSCH with type B repetition, in accordance with aspects of the present disclosure.

FIG. 11A illustrates an example slot format 1100 including an SBFD slot 1112, and transmissions by the UE 1004 transmitting a PUSCH with type B repetition, in accordance with aspects of the present disclosure. The slot format 1100 of FIG. 11A includes an uplink slot 1108 that may be used by the UE 1004 to transmit uplink information to the network entity 1002. As shown, the uplink slot 1108 includes an uplink subband 1110 that spans the entire BWP 1106. Further, as shown, the slot format 1100 includes an SBFD slot 1112 that may be used by the network for transmitting downlink information to the UE 1004 as well as receiving uplink information from the UE. As shown, the SBFD slot 1112 includes an uplink subband 1114 that spans only a portion of the BWP 1106. Additionally, the SBFD slot 1112 includes a downlink subband 1116 and a downlink subband 1118, each spanning a different portion of the BWP 1106. While the uplink subband 1114, downlink subband 1116, and downlink subband 1118 are illustrated as spanning the entire SBFD slot 1112, the uplink subband 1114, downlink subband 1116, and downlink subband 1118 within the SBFD slot 1112 may be allocated on a symbol-by-symbol granularity.

A nominal repetition of a PUSCH, which is a first nominal repetition, includes the time and frequency resources 1130 and 1132. The first nominal repetition includes a first actual repetition that includes the time and frequency resources 1130 and a second actual repetition that includes the time and frequency resources 1132. Because the first actual repetition falls in the uplink slot 1108 (e.g., a non-FD slot), the UE determines to multiplex the UCI 1140 with the PUSCH in the time and frequency resources 1130, according to aspects of the present disclosure. Thus, the UE 1004 determining to multiplex the UCI 1140 with the PUSCH in the time and frequency resources 1130 may be an example of the UE 1004 taking one or more actions at 1008, and transmitting the PUSCH with the multiplexed UCI 1140 in the time and frequency resources 1130 may be an example of the UE 1004 transmitting, based on the one or more actions related to the multiplexing, at least the first UL data channel repetition at 1010.

Figure 11B:
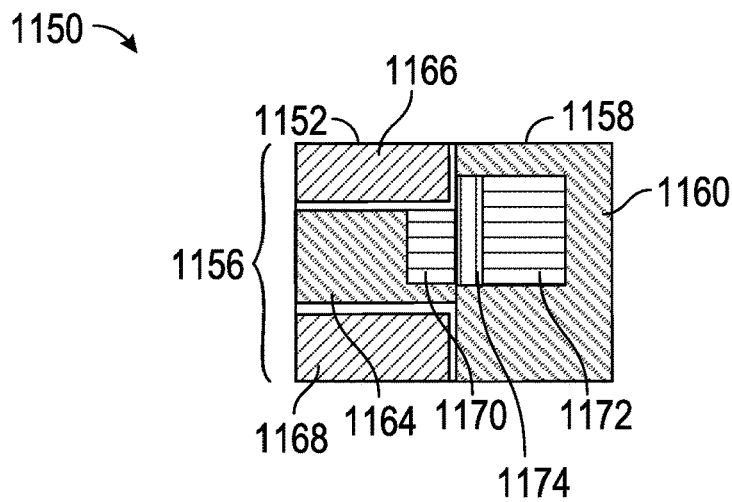

FIG. 11B illustrates an example slot format 1150, including an SBFD slot 1152, and transmissions by the UE 1004 transmitting a PUSCH with type B repetition, in accordance with aspects of the present disclosure. The slot format 1150 of FIG. 11B includes an uplink slot 1158 that may be used by the UE to transmit uplink information to the network entity 1002. As shown, the uplink slot 1158 includes an uplink subband 1160 that spans the entire BWP 1156. Further, as shown, the slot format 1150 includes an SBFD slot 1152 that may be used by the network for transmitting downlink information to the UE as well as receiving uplink information from the UE. As shown, the SBFD slot 1152 includes an uplink subband 1164 that spans only a portion of the BWP 1156. Additionally, the SBFD slot 1152 includes a downlink subband 1166 and a downlink subband 1168, each spanning a different portion of the BWP 1156. While the uplink subband 1164, downlink subband 1166, and downlink subband 1168 are illustrated as spanning the entire SBFD slot 1152, the uplink subband 1164, downlink subband 1166, and downlink subband 1168 within the SBFD slot 1152 may be allocated on a symbol-by-symbol granularity.

Time and frequency resources 1170 and 1172 in the slot format 1150 are allocated for PUSCH repetitions. The UE 1004 may transmit a nominal repetition 0 of a PUSCH, wherein the nominal repetition includes an actual repetition 0 in the time and frequency resources 1170 and an actual repetition 1 in the time and frequency resources 1172. UCI that the UE transmits multiplexed with the PUSCH may be conveyed in the time and frequency resources 1174. Because the first actual repetition falls in the SBFD slot 1152, the UE determines based on the available bandwidth of the first actual repetition in time and frequency resources 1170 being smaller than a threshold proportion of the bandwidth of a nominal repetition in a U slot (e.g., the bandwidth of the time and frequency resources 1172), not to multiplex the UCI with the PUSCH in the time and frequency resources 1170, according to aspects of the present disclosure. The UE instead multiplexes the UCI in the time and frequency resources 1174 with the PUSCH in the time and frequency resources 1172. Thus, determining to multiplex the UCI in the time and frequency resources 1174 with the PUSCH in the time and frequency resources 1172 may be an example of the UE 1004 taking one or more actions at 1008, and transmitting the PUSCH with the multiplexed UCI in the time and frequency resources 1172 may be an example of the UE 1004 transmitting, based on the one or more actions related to the multiplexing, at least the first UL data channel repetition at 1010.

According to aspects of the present disclosure, when the UE 1004 transmits a PUSCH with repetition Type B, then the UE may multiplex UCI over two repetitions by dividing the UCI by type (e.g., ACK/NACKs and CSI) and multiplexing the first type of UCI with the PUSCH in the first repetition and multiplexing the second type of UCI with the PUSCH in the second repetition.

Figure 11C:
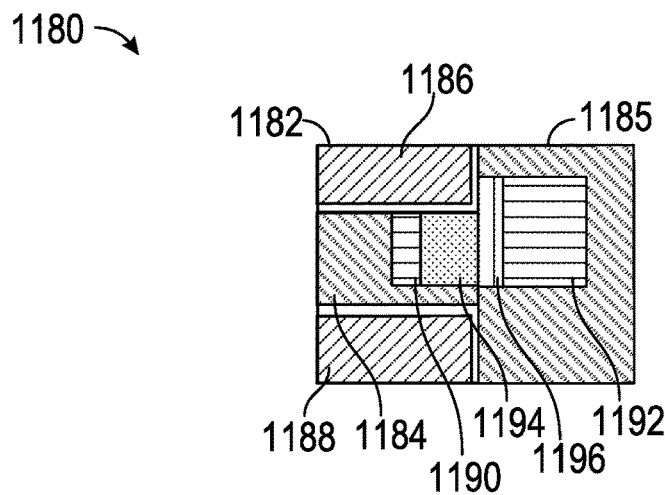

FIG. 11C illustrates an example slot format 1180 and transmissions by the UE 1004 transmitting a PUSCH with type B repetition, in accordance with aspects of the present disclosure. The slot format 1180 of FIG. 11C includes an UL slot 1185 and an SBFD slot 1182. As shown, the SBFD slot 1182 includes an uplink subband 1184 and downlink subbands 1186 and 1188. Time and frequency resources 1190 and 1192 in the slot format 1180 are allocated for PUSCH repetitions. The UE may transmit a nominal repetition 0 of a PUSCH, wherein the nominal repetition includes an actual repetition 0 in the time and frequency resources 1190 and an actual repetition 1 in the time and frequency resources 1192. UCI of a first type (e.g., ACK/NACKs) that the UE 1004 transmits multiplexed with the PUSCH may be conveyed in the time and frequency resources 1194 in the SBFD slot 1182. UCI of a second type (e.g., CSI) that the UE transmits multiplexed with the PUSCH may be conveyed in the time and frequency resources 1196 in the UL slot 1185. Thus, determining to multiplex the first type of UCI with the PUSCH in the time and frequency resources 1194 and the second type of UCI with the PUSCH in the time and frequency resources 1196 may be an example of the UE 1004 taking one or more actions at 1008, and transmitting the PUSCH with the multiplexed first type of UCI in the time and frequency resources 1190 may be an example of the UE 1004 transmitting, based on the one or more actions related to the multiplexing, at least the first UL data channel repetition at 1010.

In aspects of the present disclosure, when the UE 1004 transmitting a PUSCH with repetition Type B also has UCI to transmit, then the UE may multiplex ACK/NACKs and CSI-part1 on the first actual repetition of the PUSCH, and, if the number of available resources (e.g., REs) in the first actual repetition is sufficient for CSI-part2 information (also referred to as CSI-2), then the UE also multiplexes the CSI-part2 information with the PUSCH over the first actual repetition. If the number of available resources in the first actual repetition is limited and dropping rules will be applied to the CSI-2 information, then the UE may multiplex the CSI-2 information with the PUSCH in the actual repetition having the largest amount of resources available to convey the CSI-2. More generally, when the total number of resources available in the first portion of the first UL data channel repetition for the UCI is less than a threshold number of resources: then taking the one or more actions at 1008 may include: splitting the UCI into a first portion and a second portion, and multiplexing the first portion of the UCI with the first portion of the first UL data channel repetition in the FD slot and multiplexing the second portion of the UCI with the second portion of the first UL data channel repetition in the second slot; and the transmitting at 1010 may include transmitting the first portion of the UCI multiplexed with the first portion of the UL data channel repetition in the FD slot and transmitting the second portion of the UCI multiplexed with the second portion of the UL data channel repetition in the second slot. In an example, the first portion of the UCI may include hybrid automatic repeat request (HARD) acknowledgement information (e.g., ACK/NACKs), and the second portion of the UCI may include channel state information (CSI) feedback. In another example, the first portion of the UCI may include HARQ acknowledgement information and a first part of channel state information (CSI) feedback (e.g., CSI-part1), and the second portion of the UCI may include a second part of the CSI feedback (e.g., CSI-part2).

According to aspects of the present disclosure, the number of available resources in the actual repetitions may be determined based on one or more of: one or more offset values [$\beta_{HARQ\text{-}ACK,U}$, $\beta_{CSI\text{-}1,U}$, $\beta_{CSI\text{-}2,U}$, $\beta_{HARQ\text{-}ACK,SBFD}$, $\beta_{CSI\text{-}1,SBFD}$, $\beta_{CSI\text{-}2,SBFD}$] that are described herein, a total number of REs associated with an UL subband of the first slot, and a bandwidth associated with the first UL data channel repetition. Thus, the taking one or more actions of 1008 may be based on one or more offset values, a total number of REs associated with an UL subband of the first slot, and a bandwidth associated with the first UL data channel repetition.

In aspects of the present disclosure, when the UE 1004 transmitting a PUSCH with repetition Type B also has UCI to transmit, then the UE may multiplex the UCI (e.g., ACK/NACKs and CSI) on the actual repetition having the largest amount of resources available to convey the UCI. When the first actual repetition of a nominal repetition occurs in an FD slot and the second actual repetition occurs in a non-FD slot, then the UE may multiplex the UCI in the second actual repetition (e.g., as shown in FIG. 11B), and this may be an example of the taking the one or more actions of 1008, based on at least one of a bandwidth associated with the first portion of the first UL data channel repetition or a total number of resources available in the first portion of the first UL data channel repetition for the UCI.

According to aspects of the present disclosure, taking the one or more actions at 1008 may be based on a bandwidth associated with the first portion of the first UL data channel repetition. In these aspects, when the bandwidth associated with the first portion of the first UL data channel repetition in the FD slot is greater than or equal to a threshold percentage of a bandwidth of a second UL data channel repetition in a non-FD slot: then taking the one or more actions at 1008 may include multiplexing the UCI (e.g., the UCI in the time and frequency resources 1194 in FIG. 11C) with the first portion of the first UL data channel repetition (e.g., in the time and frequency resources 1190 in FIG. 11C) in the FD slot (e.g., the SBFD slot 1182 in FIG. 11C), and the transmitting at 1010 may include transmitting the UCI multiplexed with the first portion of the UL data channel repetition in the FD slot. And, when the bandwidth associated with the first portion of the first UL data channel repetition in the FD slot is less than the threshold percentage of a bandwidth of a second UL data channel repetition in a non-FD slot: then taking the one or more actions at 1008 may include not multiplexing the UCI with the first portion of the first UL data channel repetition (e.g., in the time and frequency resources 1170 in FIG. 11B) in the FD slot (e.g., in the SBFD slot 1152 in FIG. 11B), and the transmitting at 1010 may include transmitting the first portion of the UL data channel repetition in the FD slot without the UCI.

In aspects of the present disclosure, taking the one or more actions at 1008 may be based on a total number of resources available in the first portion of the first UL data channel repetition for the UCI. In these aspects, when the total number of resources available in the first portion of the first UL data channel repetition for the UCI is greater than or equal to a threshold number of resources (e.g., as shown in FIG. 11A or FIG. 11C): the taking the one or more actions at 1008 may include multiplexing the UCI (e.g., in the time and frequency resources 1194 in FIG. 11C) with the first portion of the first UL data channel repetition (e.g., in the time and frequency resources 1190 in FIG. 11C) in the FD slot (e.g., in the SBFD slot 1182 in FIG. 11C), and the transmitting at 1010 may include transmitting the UCI multiplexed with the first portion of the UL data channel repetition in the FD slot. And, when the total number of resources associated with the first portion of the first UL data channel repetition in the FD slot is less than the threshold number of resources: then taking the one or more actions at 1008 may include not multiplexing the UCI with the first portion of the first UL data channel repetition (e.g., in the time and frequency resources 1170 in FIG. 11B) in the FD slot (e.g., in the SBFD slot 1152 in FIG. 11B), and the transmitting at 1010 may include transmitting the first portion of the UL data channel repetition in the FD slot without the UCI.

According to aspects of the present disclosure, when the UE 1004 transmitting a PUSCH with repetition Type B also has UCI comprising HARQ acknowledgement information, CSI-part1, and CSI-part2 to transmit, then taking the one or more actions at 1008 may include the UE 1104 omitting some or all of the CSI-part2 from being multiplexed with the first portion of the UL data channel repetition and multiplexing the remaining UCI with the first portion of the UL data channel repetition. For example, when the number of resources available for the UCI in the first portion of the first UL data channel repetition is not sufficient for transmitting all of the CSI-part2 in the first portion of the first UL data channel repetition, then taking the one or more actions at 1008 may include: omitting some or all of the CSI-part2 information from being multiplexed with the first portion of the first UL data channel repetition, and multiplexing the HARQ acknowledgement information, CSI-part1, and the remainder of the CSI-part2 with the first portion of the first UL data channel repetition. As previously described, the CSI-part2 may be dropped or omitted based on priority level of the CSI-part2.

In aspects of the present disclosure, the UE 1004 may determine whether to drop (e.g., not transmit) UCI based on values of a, which may be an example of an adjustment factor as described herein, that vary depending on the type of the UCI and/or whether the slot or symbol for the transmission is an SBFD slot or symbol.

According to aspects of the present disclosure, the UE 1004 may determine a value of a (e.g., an adjustment factor) for use in calculating a number of symbols available for transmission of UCI multiplexed with a PUSCH based on whether the PUSCH is scheduled for transmission in an SBFD slot or SBFD symbol.

In aspects of the present disclosure, the UE 1004 may determine a value of a for use in calculating a number of symbols available for transmission of UCI multiplexed with a PUSCH based on the type of the UCI (e.g., ACK/NACKs, CSI-part1, or CSI-part2) when the PUSCH is scheduled for transmission in an SBFD slot or SBFD symbol. As the multiplexing of the UCI with the PUSCH may be based on the number of resources available for transmission of the UCI, the taking one or more actions at 1008 may be based on the value of a determined by the UE.

According to aspects of the present disclosure, the UE 1004 transmitting a PUSCH on an SBFD slot that has both downlink and uplink parts (also referred to herein as a "D+U" slot) may be restricted from multiplexing some UCI with the PUSCH in the D+U slot.

In aspects of the present disclosure, because D+U slots may be highly useful for conveying latency-sensitive information, the UE 1004 may only multiplex latency-sensitive UCI in PUSCHs scheduled for transmission in a D+U slot. Thus, in these cases, the UE 1004 may determine not to multiplex periodic or semi-persistent (P/SP) CSI reports with PUSCHs scheduled in a D+U slot. Thus, the UE 1004 may only transmit P/SP CSI reports in U slots. The UE may multiplex aperiodic CSI (A-CSI) reports and ACK/NACKs with PUSCHs in D+U slots, as A-CSI and ACK/NACKs may be considered latency sensitive. More generally, taking one or more actions at 1008 may be based on one or more rules associated with latency requirements of different types of information included in the UCI. For example, a network standard may include one or more rules that may specify that: a first type of information (e.g., HARQ acknowledgement information or A-CSI reports) included in the UCI is permitted to be multiplexed with the first portion of the first UL data channel repetition in an FD slot, and a second type of information (e.g., CSI-part1 or semi-persistently scheduled CSI reports) and third type of information (e.g., CSI-part2 or periodic CSI reports) included in the UCI are not permitted to be multiplexed with the first UL data channel repetition in the FD slot. In the example, the taking one or more actions at 1008 may include: omitting the second type of information and third type of information included in the UCI from being multiplexed with a first portion of the first UL data channel repetition in an FD slot, and multiplexing the first type of information included in the UCI with the first portion of the first UL data channel repetition in the FD slot.

According to aspects of the present disclosure, dropping rules applicable to UCI may be defined for D+U slots. For example, the UE 1004 may only multiplex ACK/NACKs with PUSCHs scheduled for transmission in D+U slots, and other types of UCI may not be multiplexed with the PUSCHs scheduled for transmission in D+U slots. In another example, the UE 1004 may only multiplex ACK/NACKs and CSI-part1 with PUSCHs scheduled for transmission in D+U slots, and CSI-part2 may not be multiplexed with the PUSCHs scheduled for transmission in D+U slots.

Example Operations of a User Equipment

Figure 12:
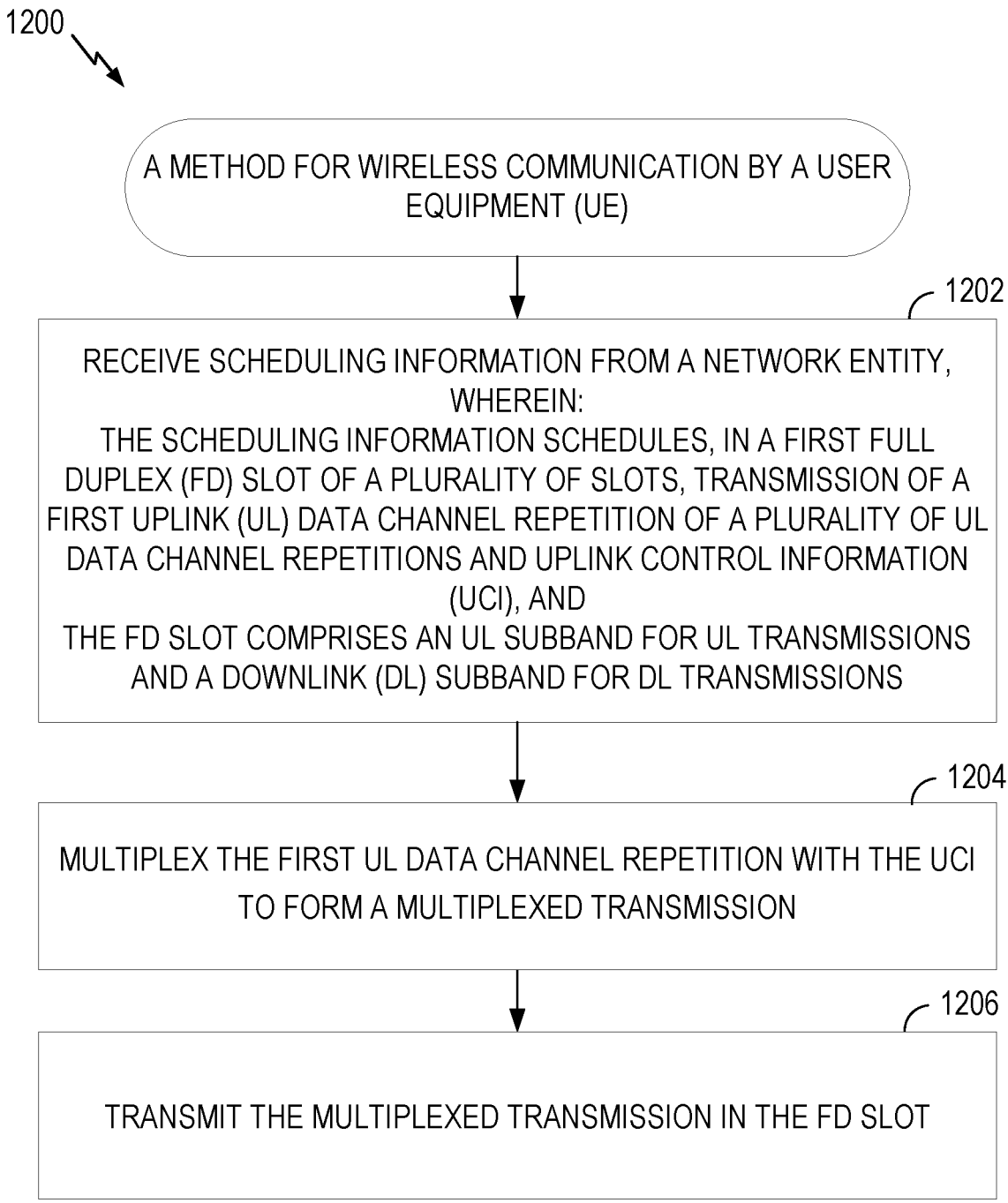
FIG. 12 depicts a method for wireless communication.

FIG. 12 shows a method 1200 for wireless communication by a UE, such as UE 104 of FIGS. 1 and 3.

Method 1200 begins at 1202 with receiving scheduling information from a network entity, wherein: the scheduling information schedules, in a first full duplex (FD) slot of a plurality of slots, transmission of a first uplink (UL) data channel repetition of a plurality of UL data channel repetitions and uplink control information (UCI), and the FD slot comprises an UL subband for UL transmissions and a downlink (DL) subband for DL transmissions.

Method 1200 then proceeds to step 1204 with multiplexing the first UL data channel repetition with the UCI to form a multiplexed transmission.

Method 1200 then proceeds to step 1206 with transmitting the multiplexed transmission in the FD slot.

Various aspects relate to the method 1200, including the following aspects.

In one aspect, multiplexing the first UL data channel repetition with the UCI to form the multiplexed transmission for transmission in the FD slot is based on one or more offset values, associated with a non-FD slot of the plurality of slots, used for determining a number of resource elements (REs) for multiplexing the UCI in the first UL data channel repetition.

In some aspects, method 1200 further includes determining the number of REs for multiplexing the UCI based on the one or more offset values associated with the non-FD slot, wherein multiplexing the first UL data channel repetition with the UCI comprises multiplexing the determined number of REs for the UCI with the first UL data channel repetition to form the multiplexed transmission.

In some aspects, determining the number of REs for multiplexing the UCI is based further on a total number of REs associated with the UL subband of the FD slot and a bandwidth associated with the first UL data channel repetition.

In some aspects, each of the one or more offset values is associated with a different type of information in the UCI.

In some aspects, method 1200 further includes omitting at least a portion a first type of information in the UCI from being multiplexed with the first UL data channel repetition when, based on the total number of REs associated with the UL subband of the FD slot and a number of REs associated with the first type of information, the UL subband of the FD slot does not include enough REs for the portion of the first type of information.

In some aspects, omitting the portion of the first type of information is based on a priority level associated with this portion of the first type of information.

In one aspect, multiplexing the first UL data channel repetition with the UCI to form the multiplexed transmission for transmission in the FD slot is based on a first set of offset values used for determining a number of resource elements (REs) for multiplexing the UCI in the first UL data channel repetition, and the first set of offset values are associated with the FD slot and are different from a second set of offset values associated with non-FD slots.

In some aspects, the first set of offset values associated with the first FD slot includes different offset values for different types of information in the UCI.

In some aspects, the first set of offset values associated with the FD slot depend on a total number of resource element (REs) of the UL subband of the FD slot, and the second set of offset values associated with the non-FD slots depend on a total number of REs an UL subband of the non-FD slots.

In some aspects, method 1200 further includes determining the number of REs for multiplexing the UCI based on the first set of offset values associated with the FD slot, wherein multiplexing the first UL data channel repetition with the UCI comprises multiplexing the determined number of REs for the UCI with the first UL data channel repetition to form the multiplexed transmission.

In some aspects, determining the number of REs for multiplexing the UCI is based further on a total number of REs associated an UL subband of a non-FD slot. In some aspects, determining the number of REs for multiplexing the UCI is based further on an adjustment factor that limits the number of REs available for the UCI in the first FD slot.

In some aspects, the scheduling information comprises a first type of configured grant received via radio resource control (RRC) signaling from the network entity, and method 1200 further includes receiving the first set of offset values and the second set of offset values via the RRC signaling from the network entity.

In some aspects, the scheduling information comprises a second type of configured grant received in downlink control information (DCI) via a physical downlink control channel (PDCCH) from the network entity, or the scheduling information comprises a dynamic grant received in downlink control information (DCI) via a physical downlink control channel (PDCCH) from the network entity.

In some aspects, the DCI further includes one of the first set of offset values or the second set of offset values associated with the non-FD slots.

In some aspects, the DCI further includes the second set of offset values associated with the non-FD slots, and method 1200 further includes deriving the first set of offset values associated with the FD slot based on the second set of offset values associated with the non-FD slots and one or more rules in a wireless standard.

In some aspects, the DCI further includes the second set of offset values associated with the non-FD slots, and method 1200 further includes: receiving a delta value via radio resource control (RRC) signaling from the network entity, and deriving the first set of offset values associated with the FD slot by applying the delta value to offset values in the second set of offset values associated with the non-FD slots.

In some aspects, the DCI further includes the first set of offset values associated with the FD slot and the second set of offset values associated with the non-FD slots.

In some aspects, the DCI indicates the first set of offset values associated with the FD slot and the second set of offset values associated with the non-FD slots via more than two bits.

Figure 16:
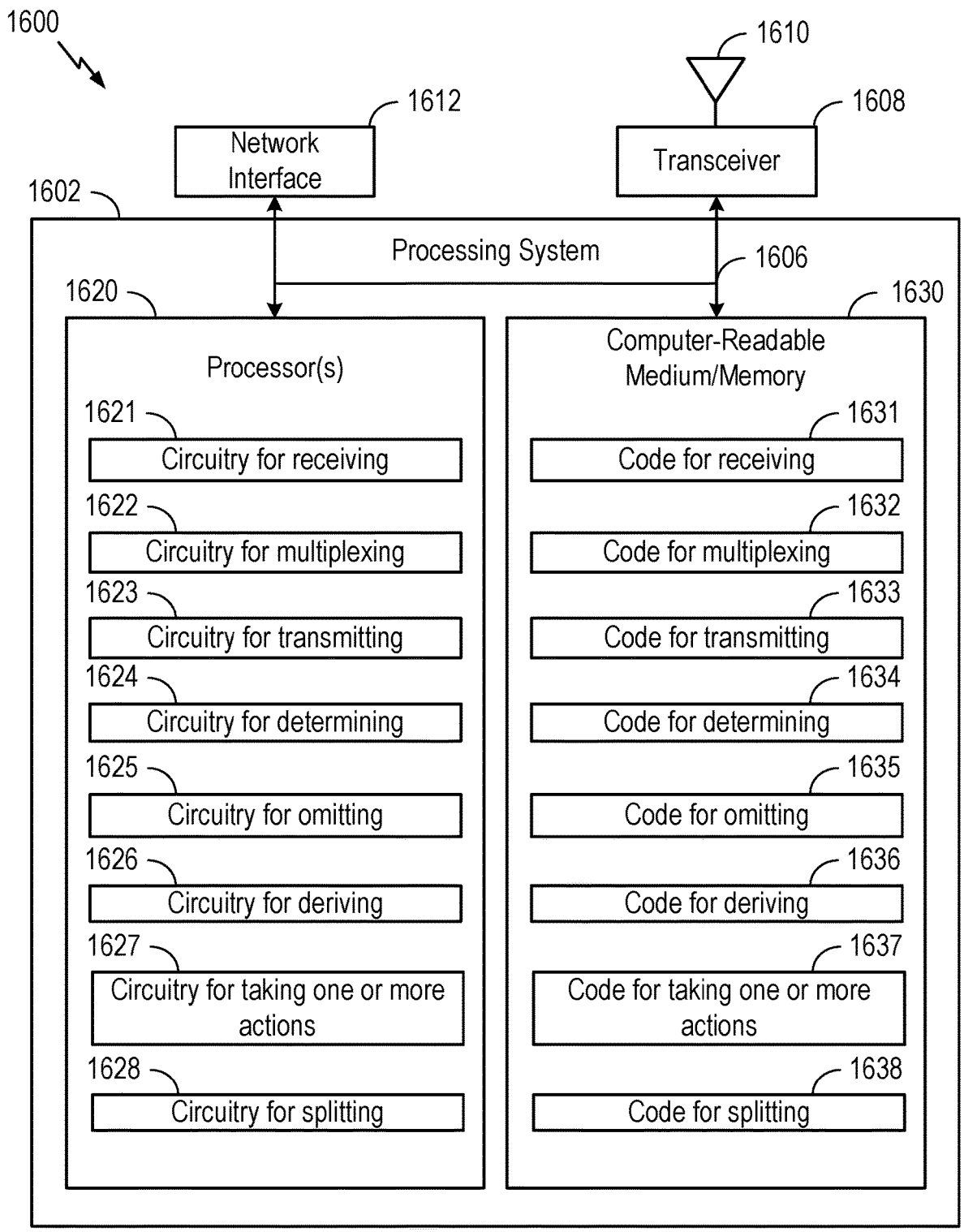
FIG. 16 depicts aspects of an example communications device.

In one aspect, method 1200, or any aspect related to it, may be performed by an apparatus, such as communication device 1600 of FIG. 16, which includes various components operable, configured, or adapted to perform the method 1200. Communication device 1600 is described below in further detail.

Note that FIG. 12 is just one example of a method, and other methods including fewer, additional, or alternative steps are possible consistent with this disclosure.

Figure 13:
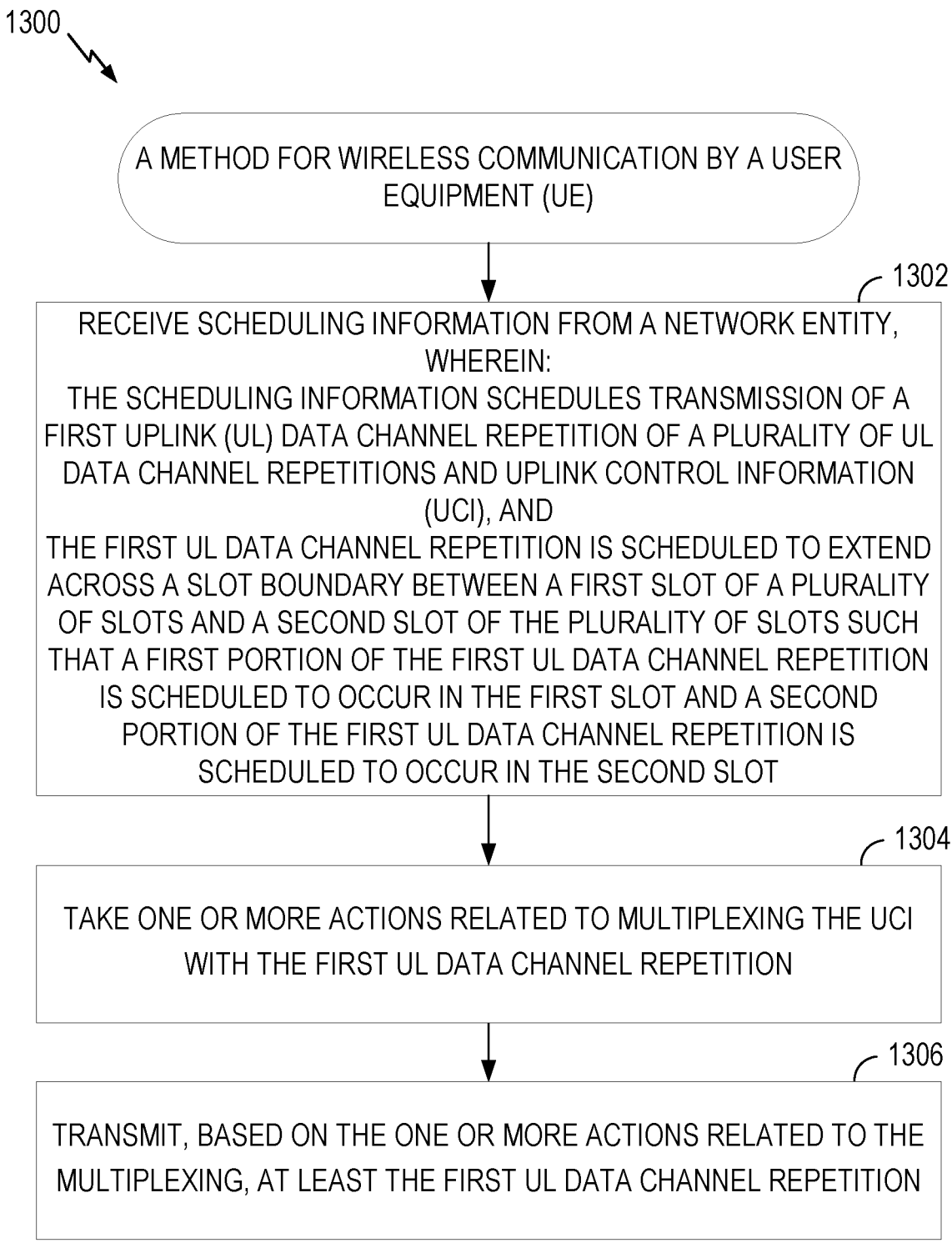
FIG. 13 depicts a method for wireless communication.

FIG. 13 shows a method 1300 for wireless communication by a UE, such as UE 104 of FIGS. 1 and 3.

Method 1300 begins at 1302 with receiving scheduling information from a network entity, wherein: the scheduling information schedules transmission of a first uplink (UL) data channel repetition of a plurality of UL data channel repetitions and uplink control information (UCI), and the first UL data channel repetition is scheduled to extend across a slot boundary between a first slot of a plurality of slots and a second slot of the plurality of slots such that a first portion of the first UL data channel repetition is scheduled to occur in the first slot and a second portion of the first UL data channel repetition is scheduled to occur in the second slot.

Method 1300 then proceeds to step 1304 with taking one or more actions related to multiplexing the UCI with the first UL data channel repetition.

Method 1300 then proceeds to step 1306 with transmitting, based on the one or more actions related to the multiplexing, at least the first UL data channel repetition.

Various aspects relate to the method 1300, including the following aspects.

In one aspect, taking the one or more actions related to the multiplexing the UCI with the first UL data channel repetition is based on a slot type associated with the first slot in which the first portion of the first UL data channel repetition is scheduled.

In some aspects, the slot type associated with the first slot in which the first portion of the first UL data channel repetition is scheduled comprises a non-full duplex (FD) slot, and taking the one or more actions related to the multiplexing the UCI with the first UL data channel repetition comprises multiplexing the UCI with the first portion of the first UL data channel repetition based on based on the slot type associated with the first slot in which the first portion of the first UL data channel repetition is scheduled being the non-FD slot.

In some aspects, multiplexing the UCI with the first portion of the first UL data channel repetition is further based on one or more offset values, associated with the non-FD slot, used for determining a number of resource elements (REs) for multiplexing the UCI with the first portion of the first UL data channel repetition.

In some aspects, multiplexing the UCI with the first portion of the first UL data channel repetition further includes: determining the number of REs for multiplexing the UCI based on the one or more offset values associated with the non-FD slot, a total number of REs associated with an UL subband of the first slot, and a bandwidth associated with the first UL data channel repetition, and multiplexing the determined number of REs for the UCI with the first portion of the first UL data channel repetition.

In some aspects, the slot type associated with the first slot in which the first portion of the first UL data channel repetition is scheduled comprises a full duplex (FD) slot, and taking the one or more actions related to the multiplexing the UCI with the first UL data channel repetition is based further on at least one of a bandwidth associated with the first portion of the first UL data channel repetition or a total number of resources available in the first portion of the first UL data channel repetition for the UCI.

In some aspects, when the bandwidth associated with the first portion of the first UL data channel repetition in the FD slot is greater than or equal to a threshold percentage of a bandwidth of a second UL data channel repetition in a non-FD slot: taking the one or more actions related to the multiplexing the UCI with the first UL data channel repetition includes multiplexing the UCI with the first portion of the first UL data channel repetition in the FD slot, and transmitting at least the first UL data channel repetition includes transmitting the UCI multiplexed with the first portion of the UL data channel repetition in the FD slot.

In some aspects, when the bandwidth associated with the first portion of the first UL data channel repetition in the FD slot is less than the threshold percentage of a bandwidth of a second UL data channel repetition in a non-FD slot: taking the one or more actions related to the multiplexing the UCI with the first UL data channel repetition includes not multiplexing the UCI with the first portion of the first UL data channel repetition in the FD slot, and transmitting at least the first UL data channel repetition includes transmitting the first portion of the UL data channel repetition in the FD slot without the UCI.

In some aspects, when the total number of resources available in the first portion of the first UL data channel repetition for the UCI is greater than or equal to a threshold number of resources: taking the one or more actions related to the multiplexing the UCI with the first UL data channel repetition includes multiplexing the UCI with the first portion of the first UL data channel repetition in the FD slot, and transmitting at least the first UL data channel repetition includes transmitting the UCI multiplexed with the first portion of the UL data channel repetition in the FD slot.

In some aspects, when the total number of resources available in the first portion of the first UL data channel repetition for the UCI is less than the threshold number of resources: taking the one or more actions related to the multiplexing the UCI with the first UL data channel repetition includes multiplexing the UCI with the first portion of the first UL data channel repetition in the FD slot, and transmitting at least the first UL data channel repetition includes transmitting the UCI multiplexed with the first portion of the UL data channel repetition in the FD slot.

In some aspects, when the total number of resources available in the first portion of the first UL data channel repetition for the UCI is less than the threshold number of resources: taking the one or more actions related to the multiplexing the UCI with the first UL data channel repetition includes: splitting the UCI into a first portion and a second portion, and multiplexing the first portion of the UCI with the first portion of the first UL data channel repetition in the FD slot and multiplexing the second portion of the UCI with the second portion of the first UL data channel repetition in the second slot, and transmitting at least the first UL data channel repetition includes transmitting the first portion of the UCI multiplexed with the first portion of the UL data channel repetition in the FD slot and transmitting the second portion of the UCI multiplexed with the second portion of the UL data channel repetition in the second slot.

In some aspects, the first portion of the UCI includes hybrid automatic repeat request (HARD) acknowledgement information, and the second portion of the UCI includes channel state information (CSI) feedback.

In some aspects, the total number of resources available in the first portion of the first UL data channel repetition for the UCI is less a number of resources available in the second portion of the first UL data channel repetition: taking the one or more actions related to the multiplexing the UCI with the first UL data channel repetition includes multiplexing the UCI with the second portion of the first UL data channel repetition, and transmitting at least the first UL data channel repetition includes transmitting the UCI multiplexed with the second portion of the first UL data channel repetition in the second slot.

In some aspects, the slot type associated with the first slot in which the first portion of the first UL data channel repetition is scheduled includes a full duplex (FD) slot, and the UCI includes at least a first portion including a first type of information and a second portion including a second type of information.

In some aspects, based on the FD slot in which the first portion of the first UL data channel repetition is scheduled, taking the one or more actions related to the multiplexing the UCI with the first UL data channel repetition includes: omitting the second portion of the UCI including the second type of information from being multiplexed with the first portion of the first UL data channel repetition, and multiplexing the first portion of the UCI including the first type of information with the first portion of the first UL data channel repetition.

In some aspects, method 1300 further includes determining a number of resources available for the UCI in the first portion of the first UL data channel repetition based on an adjustment factor.

In some aspects, the adjustment factor is unique to FD slots, including the FD slot in which the first portion of the first UL data channel repetition is scheduled, and is different from adjustment factors associated with non-FD slots.

In some aspects, the adjustment factor is unique to the second type of information of the UCI and to FD slots, including the FD slot in which the first portion of the first UL data channel repetition is scheduled, and is different from adjustment factors associated with non-FD slots and from adjustment factors associated with other types of information in the UCI.

In some aspects, based on the adjustment factor, the number of resources available for the UCI in the first portion of the first UL data channel repetition is not sufficient for transmitting the second portion of the UCI in the first portion of the first UL data channel repetition, and taking the one or more actions related to the multiplexing the UCI with the first UL data channel repetition includes: omitting the second portion of the UCI including the second type of information from being multiplexed with the first portion of the first UL data channel repetition, and multiplexing the first portion of the UCI including the first type of information with the first portion of the first UL data channel repetition.

In some aspects, based on the adjustment factor, the number of resources available for the UCI in the first portion of the first UL data channel repetition is sufficient for transmitting the second portion of the UCI in the first portion of the first UL data channel repetition, and taking the one or more actions related to the multiplexing the UCI with the first UL data channel repetition includes: multiplexing the first portion of the UCI including the first type of information and the second portion of the UCI including the second type of information with the first portion of the first UL data channel repetition.

In some aspects, the slot type associated with the first slot in which the first portion of the first UL data channel repetition is scheduled includes a full duplex (FD) slot, and taking one or more actions related to multiplexing the UCI with the first UL data channel repetition is based on one or more rules associated with latency requirements of different types of information included in the UCI.

In some aspects, the UCI includes a first type of information associated with a first latency requirement and a second type of information associated with a second latency requirement, and the one or more rules specify that: the first type of information included in the UCI associated with the first latency requirement is permitted to be multiplexed with the first portion of the first UL data channel repetition in the FD slot, and the second type of information included in the UCI associated with the second latency requirement is not permitted to be multiplexed with the first UL data channel repetition in a FD slot.

In some aspects, taking one or more actions related to multiplexing the UCI with the first UL data channel repetition based on the one or more rules includes: omitting the second type of information included in the UCI from being multiplexed with the first portion of the first UL data channel repetition in the FD slot, and multiplexing the first type of information included in the UCI with the first portion of the first UL data channel repetition in the FD slot.

In some aspects, the slot type associated with the first slot in which the first portion of the first UL data channel repetition is scheduled includes a full duplex (FD) slot, the UCI includes a first type of information, a second type of information, and a third type of information, and taking one or more actions related to multiplexing the UCI with the first UL data channel repetition is based on one or more rules associated with different types of information included in the UCI.

In some aspects, the one or more rules specify that: the first type of information included in the UCI is permitted to be multiplexed with the first portion of the first UL data channel repetition in the FD slot, and the second type of information and third type of information included in the UCI associated are not permitted to be multiplexed with the first UL data channel repetition in the FD slot.

In some aspects, taking one or more actions related to multiplexing the UCI with the first UL data channel repetition based on the one or more rules includes: omitting the second type of information and third type of information included in the UCI from being multiplexed with the first portion of the first UL data channel repetition in the FD slot, and multiplexing the first type of information included in the UCI with the first portion of the first UL data channel repetition in the FD slot.

In some aspects, the one or more rules specify that: the first type of information and the second type of information included in the UCI is permitted to be multiplexed with the first portion of the first UL data channel repetition in the FD slot, and the third type of information included in the UCI associated is not permitted to be multiplexed with the first UL data channel repetition in the FD slot.

In some aspects, taking one or more actions related to multiplexing the UCI with the first UL data channel repetition based on the one or more rules includes: omitting the third type of information included in the UCI from being multiplexed with the first portion of the first UL data channel repetition in the FD slot, and multiplexing the first type of information and the second type of information included in the UCI with the first portion of the first UL data channel repetition in the FD slot.

Figure 17:
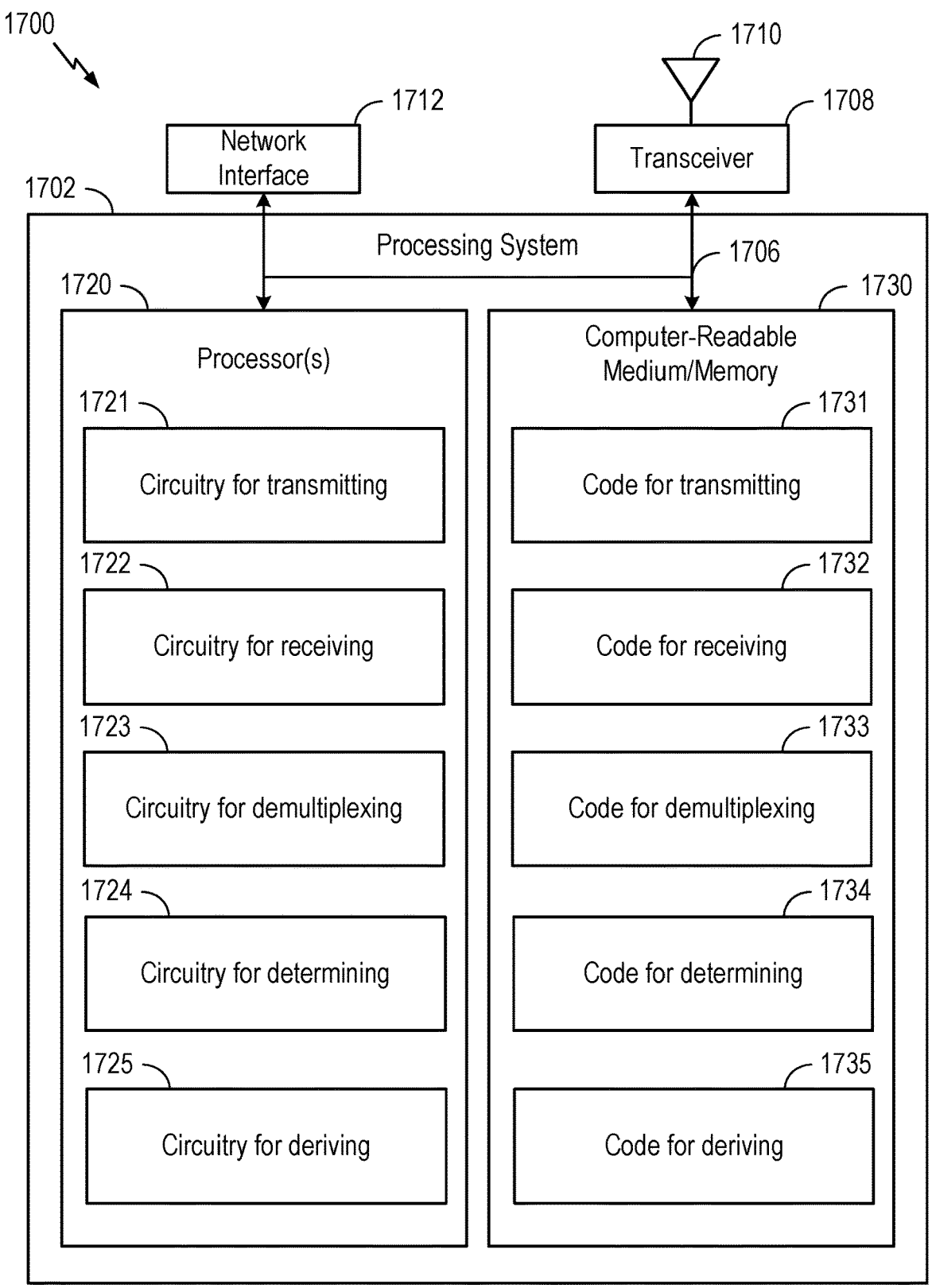
FIG. 17 depicts aspects of an example communications device.

In one aspect, method 1300, or any aspect related to it, may be performed by an apparatus, such as communication device 1700 of FIG. 17, which includes various components operable, configured, or adapted to perform the method 1300. Communication device 1700 is described below in further detail.

Note that FIG. 13 is just one example of a method, and other methods including fewer, additional, or alternative steps are possible consistent with this disclosure.

Example Operations of a Network Entity

FIG. 14 shows a method 1400 for wireless communication by a network entity, such as BS 102 of FIGS. 1 and 3 or a disaggregated BS as described with respect to FIG. 2.

Method 1400 begins at 1402 with transmitting scheduling information to a user equipment (UE), wherein: the scheduling information schedules, in a first full duplex (FD) slot of a plurality of slots, transmission of a first uplink (UL) data channel repetition of a plurality of UL data channel repetitions and uplink control information (UCI), and the FD slot comprises an UL subband for UL transmissions and a downlink (DL) subband for DL transmissions.

Method 1400 then proceeds to step 1404 with receiving a multiplexed transmission in the FD slot, the multiplexed transmission comprising the first UL data channel repetition and the UCI.

Method 1400 then proceeds to step 1406 with demultiplexing the UCI from the multiplexed transmission.

In some aspects, demultiplexing the UCI from the multiplexed transmission is based on one or more offset values, associated with a non-FD slot of the plurality of slots, used for determining a number of resource elements (REs) for multiplexing the UCI in the first UL data channel repetition.

In some aspects, method 1400 further includes determining the number of REs for multiplexing the UCI based on the one or more offset values associated with the non-FD slot. In some aspects, demultiplexing the UCI from the multiplexed transmission comprises demultiplexing the determined number of REs for the UCI from the multiplexed transmission.

In some aspects, determining the number of REs for multiplexing the UCI is based further on a total number of REs associated with the UL subband of the FD slot and a bandwidth associated with the first UL data channel repetition.

In some aspects, each of the one or more offset values is associated with a different type of information in the UCI.

In some aspects, method 1400 further includes determining a portion a first type of information in the UCI is omitted from the multiplexed transmission when, based on the total number of REs associated with the UL subband of the FD slot and a number of REs associated with the first type of information, the UL subband of the FD slot does not include enough REs for the portion of the first type of information.

In some aspects, demultiplexing the UCI from the multiplexed transmission is based on a first set of offset values used for determining a number of resource elements (REs) for multiplexing the UCI in the first UL data channel repetition, and the first set of offset values are associated with the FD slot and are different from a second set of offset values associated with non-FD slots.

In some aspects, the first set of offset values associated with the first FD slot includes different offset values for different types of information in the UCI.

In some aspects, the first set of offset values associated with the FD slot depend on a total number of resource element (REs) of the UL subband of the FD slot, and the second set of offset values associated with the non-FD slots depend on a total number of REs an UL subband of the non-FD slots.

In some aspects, method 1400 further includes determining the number of REs for multiplexing the UCI based on the first set of offset values associated with the FD slot, wherein demultiplexing the UCI from the multiplexed transmission comprises demultiplexing the determined number of REs for the UCI from the multiplexed transmission.

In some aspects, determining the number of REs for multiplexing the UCI is based further on a total number of REs associated an UL subband of a non-FD slot.

In some aspects, determining the number of REs for multiplexing the UCI is based further on an adjustment factor that limits the number of REs available for the UCI in the first FD slot.

In some aspects, the scheduling information comprises a first type of configured grant transmitted via radio resource control (RRC) signaling to the UE, and the method further comprising transmitting the first set of offset values and the second set of offset values via the RRC signaling to the UE.

In some aspects, the scheduling information comprises a second type of configured grant transmitted in downlink control information (DCI) via a physical downlink control channel (PDCCH) to the UE. In some aspects, the scheduling information comprises a dynamic grant transmitted in downlink control information (DCI) via a physical downlink control channel (PDCCH) to the UE.

In some aspects, the DCI further includes one of the first set of offset values or the second set of offset values associated with the non-FD slots.

In some aspects, the DCI further includes the second set of offset values associated with the non-FD slots, and the method further comprises deriving the first set of offset values associated with the FD slot based on the second set of offset values associated with the non-FD slots and one or more rules in a wireless standard.

In some aspects, the DCI further includes the second set of offset values associated with the non-FD slots, and the method further comprises: transmitting a delta value via radio resource control (RRC) signaling to the UE, and deriving the first set of offset values associated with the FD slot by applying the delta value to offset values in the second set of offset values associated with the non-FD slots.

In some aspects, the DCI further includes the first set of offset values associated with the FD slot and the second set of offset values associated with the non-FD slots.

In some aspects, the DCI indicates the first set of offset values associated with the FD slot and the second set of offset values associated with the non-FD slots via more than two bits.

Note that FIG. 14 is just one example of a method, and other methods including fewer, additional, or alternative steps are possible consistent with this disclosure.

Figure 15:
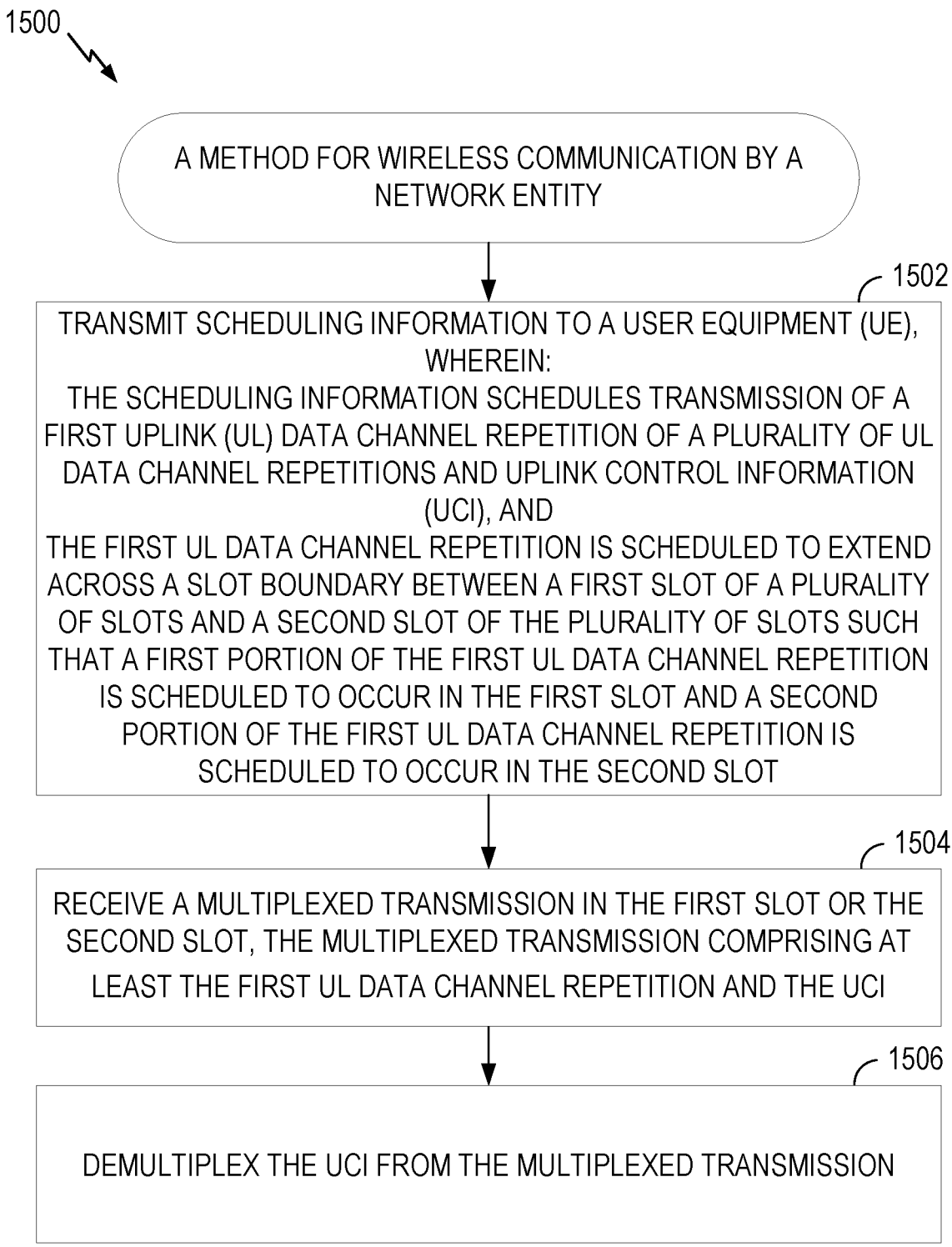
FIG. 15 depicts a method for wireless communication.

FIG. 15 shows a method 1500 for wireless communication by a network entity, such as BS 102 of FIGS. 1 and 3 or a disaggregated BS as described with respect to FIG. 2.

Method 1500 begins at 1502 with transmitting scheduling information to a user equipment (UE), wherein: the scheduling information schedules transmission of a first uplink (UL) data channel repetition of a plurality of UL data channel repetitions and uplink control information (UCI), and the first UL data channel repetition is scheduled to extend across a slot boundary between a first slot of a plurality of slots and a second slot of the plurality of slots such that a first portion of the first UL data channel repetition is scheduled to occur in the first slot and a second portion of the first UL data channel repetition is scheduled to occur in the second slot.

Method 1500 then proceeds to step 1504 with receiving a multiplexed transmission in the first slot or the second slot, the multiplexed transmission comprising at least the first UL data channel repetition and the UCI.

Method 1500 then proceeds to step 1506 with demultiplexing the UCI from the multiplexed transmission.

In some aspects, demultiplexing the UCI from the multiplexed transmission is based on a slot type associated with the first slot in which the first portion of the first UL data channel repetition is scheduled.

In some aspects, the slot type associated with the first slot in which the first portion of the first UL data channel repetition is scheduled comprises a non-full duplex (FD) slot. In some aspects, demultiplexing the UCI from the multiplexed transmission comprises demultiplexing the UCI from the multiplexed transmission based on the slot type associated with the first slot in which the first portion of the first UL data channel repetition is scheduled being the non-FD slot.

In some aspects, demultiplexing the UCI from the multiplexed transmission is further based on one or more offset values, associated with the non-FD slot, used for determining a number of resource elements (REs) for multiplexing the UCI with the first portion of the first UL data channel repetition.

In some aspects, demultiplexing the UCI from the multiplexed transmission further comprises: determining the number of REs for multiplexing the UCI based on the one or more offset values associated with the non-FD slot, a total number of REs associated with an UL subband of the first slot, and a bandwidth associated with the first UL data channel repetition, and demultiplexing the determined number of REs for the UCI from the multiplexed transmission.

In some aspects, the slot type associated with the first slot in which the first portion of the first UL data channel repetition is scheduled comprises a full duplex (FD) slot. In some aspects, demultiplexing the UCI from the multiplexed transmission is based further on at least one of a bandwidth associated with the first portion of the first UL data channel repetition or a total number of resources available in the first portion of the first UL data channel repetition for the UCI.

In some aspects, when the bandwidth associated with the first portion of the first UL data channel repetition in the FD slot is greater than or equal to a threshold percentage of a bandwidth of a second UL data channel repetition in a non-FD slot: demultiplexing the UCI from the multiplexed transmission comprises demultiplexing the UCI from the multiplexed transmission in the FD slot, and receiving the multiplexed transmission comprises receiving the multiplexed transmission in the FD slot.

In some aspects, when the bandwidth associated with the first portion of the first UL data channel repetition in the FD slot is less than the threshold percentage of a bandwidth of a second UL data channel repetition in a non-FD slot: demultiplexing the UCI from the multiplexed transmission comprises demultiplexing the UCI from the multiplexed transmission in the non-FD slot, and receiving the multiplexed transmission comprises receiving the multiplexed transmission in the non-FD slot.

In some aspects, when the total number of resources available in the first portion of the first UL data channel repetition for the UCI is greater than or equal to a threshold number of resources: demultiplexing the UCI from the multiplexed transmission comprises demultiplexing the UCI from the multiplexed transmission in the FD slot, and receiving the multiplexed transmission comprises receiving the multiplexed transmission in the FD slot.

In some aspects, when the total number of resources available in the first portion of the first UL data channel repetition for the UCI is less than the threshold number of resources: demultiplexing the UCI from the multiplexed transmission comprises demultiplexing the UCI from the multiplexed transmission in the FD slot, and receiving the multiplexed transmission comprises receiving the multiplexed transmission in the FD slot.

In some aspects, when the total number of resources available in the first portion of the first UL data channel repetition for the UCI is less than the threshold number of resources: demultiplexing the UCI from the multiplexed transmission comprises: demultiplexing a first portion of the UCI from the first portion of the first UL data channel repetition in the FD slot and demultiplexing a second portion of the UCI from the second portion of the first UL data channel repetition in the second slot, and receiving the multiplexed transmission comprises receiving the first portion of the UL data channel repetition in the FD slot and receiving the second portion of the UL data channel repetition in the second slot.

In some aspects, the first portion of the UCI includes hybrid automatic repeat request (HARQ) acknowledgement information, and the second portion of the UCI includes channel state information (CSI) feedback.

In some aspects, the first portion of the UCI includes hybrid automatic repeat request (HARQ) acknowledgement information and a first part of channel state information (CSI) feedback, and the second portion of the UCI includes a second part of the CSI feedback.

In some aspects, when the total number of resources available in the first portion of the first UL data channel repetition for the UCI is less a number of resources available in the second portion of the first UL data channel repetition: demultiplexing the UCI from the multiplexed transmission comprises demultiplexing the UCI from the second portion of the first UL data channel repetition, and receiving the multiplexed transmission comprises receiving the multiplexed transmission in the second slot.

In some aspects, the slot type associated with the first slot in which the first portion of the first UL data channel repetition is scheduled comprises a full duplex (FD) slot, and the UCI includes at least a first portion including a first type of information and a second portion including a second type of information.

In some aspects, wherein based on the FD slot in which the first portion of the first UL data channel repetition is scheduled, demultiplexing the UCI from the multiplexed transmission comprises: demultiplexing the first portion of the UCI including the first type of information from the first portion of the first UL data channel repetition.

In some aspects, method 1500 further includes determining a number of resources available for the UCI in the first portion of the first UL data channel repetition based on an adjustment factor.

In some aspects, the adjustment factor is unique to FD slots, including the FD slot in which the first portion of the first UL data channel repetition is scheduled, and is different from adjustment factors associated with non-FD slots.

In some aspects, the adjustment factor is unique to the second type of information of the UCI and to FD slots, including the FD slot in which the first portion of the first UL data channel repetition is scheduled, and is different from adjustment factors associated with non-FD slots and from adjustment factors associated with other types of information in the UCI.

In some aspects, based on the adjustment factor, the number of resources available for the UCI in the first portion of the first UL data channel repetition is not sufficient for transmitting the second portion of the UCI in the first portion of the first UL data channel repetition, and demultiplexing the UCI from the multiplexed transmission comprises: demultiplexing the first portion of the UCI including the first type of information from the first portion of the first UL data channel repetition.

In some aspects, based on the adjustment factor, the number of resources available for the UCI in the first portion of the first UL data channel repetition is sufficient for transmitting the second portion of the UCI in the first portion of the first UL data channel repetition, and demultiplexing the UCI from the multiplexed transmission comprises: demultiplexing the first portion of the UCI including the first type of information and the second portion of the UCI including the second type of information from the first portion of the first UL data channel repetition.

In some aspects, the slot type associated with the first slot in which the first portion of the first UL data channel repetition is scheduled comprises a full duplex (FD) slot, and demultiplexing the UCI from the multiplexed transmission is based on one or more rules associated with latency requirements of different types of information included in the UCI.

In some aspects, the UCI includes a first type of information associated with a first latency requirement and a second type of information associated with a second latency requirement, and the one or more rules specify that: the first type of information included in the UCI associated with the first latency requirement is permitted to be multiplexed with the first portion of the first UL data channel repetition in the FD slot, and the second type of information included in the UCI associated with the second latency requirement is not permitted to be multiplexed with the first UL data channel repetition in a FD slot.

In some aspects, demultiplexing the UCI from the multiplexed transmission based on the one or more rules comprises: demultiplexing the first type of information included in the UCI with the first portion of the first UL data channel repetition in the FD slot.

In some aspects, the slot type associated with the first slot in which the first portion of the first UL data channel repetition is scheduled comprises a full duplex (FD) slot, the UCI includes a first type of information, a second type of information, and a third type of information, and demultiplexing the UCI from the multiplexed transmission is based on one or more rules associated with different types of information included in the UCI.

In some aspects, the one or more rules specify that: the first type of information included in the UCI is permitted to be multiplexed with the first portion of the first UL data channel repetition in the FD slot, and the second type of information and third type of information included in the UCI associated are not permitted to be multiplexed with the first UL data channel repetition in the FD slot.

In some aspects, demultiplexing the UCI from the multiplexed transmission based on the one or more rules comprises: demultiplexing the first type of information included in the UCI from the first portion of the first UL data channel repetition in the FD slot.

In some aspects, the one or more rules specify that: the first type of information and the second type of information included in the UCI is permitted to be multiplexed with the first portion of the first UL data channel repetition in the FD slot, and the third type of information included in the UCI slot is not permitted to be multiplexed with the first UL data channel repetition in the FD slot.

In some aspects, demultiplexing the UCI from the multiplexed transmission based on the one or more rules comprises: demultiplexing the first type of information and the second type of information included in the UCI from the first portion of the first UL data channel repetition in the FD slot.

Note that FIG. 15 is just one example of a method, and other methods including fewer, additional, or alternative steps are possible consistent with this disclosure.

Example Communication Devices

FIG. 16 depicts aspects of an example communications device 1600. In some aspects, communications device 1600 is a user equipment, such as UE 104 described above with respect to FIGS. 1 and 3.

The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes one or more processors 1620. In various aspects, the one or more processors 1620 may be representative of one or more of receive processor 358, transmit processor 364, TX MIMO processor 366, and/or controller/processor 380, as described with respect to FIG. 3. The one or more processors 1620 are coupled to a computer-readable medium/memory 1630 via a bus 1606. In certain aspects, the computer-readable medium/memory 1630 is configured to store instructions (e.g., computer-executable code) that when executed by the one or more processors 1620, cause the one or more processors 1620 to perform the methods 1200 or 1300 described with respect to FIGS. 12 and 13, respectively, or any aspect related to them. Note that reference to a processor performing a function of communications device 1600 may include one or more processors performing that function of communications device 1600.

In the depicted example, computer-readable medium/memory 1630 stores code (e.g., executable instructions) for receiving 1631, code for multiplexing 1632, code for transmitting 1633, code for determining 1634, code for omitting 1635, code for deriving 1636, code for taking one or more actions 1637, and code for splitting 1638. Processing of the code 1631-1638 may cause the communications device 1600 to perform the methods 1200 or 1300 described with respect to FIGS. 12 and 13, respectively, or any aspect related to them.

The one or more processors 1620 include circuitry configured to implement (e.g., execute) the code stored in the computer-readable medium/memory 1630, including circuitry for receiving 1621, circuitry for multiplexing 1622, circuitry for transmitting 1623, circuitry for determining 1624, circuitry for omitting 1625, circuitry for deriving 1626, circuitry for taking one or more actions 1627, and circuitry for splitting 1628. Processing with circuitry 1621-1628 may cause the communications device 1600 to perform the methods 1200 or 1300 described with respect to FIGS. 12 and 13, respectively, or any aspect related to them.

Various components of the communications device 1600 may provide means for performing the methods 1200 or 1300 described with respect to FIGS. 12 and 13, respectively, or any aspect related to them. For example, means for transmitting, sending or outputting for transmission may include the transceivers 354 and/or antenna(s) 352 of the UE 104 illustrated in FIG. 3 and/or transceiver 1608 and antenna 1610 of the communications device 1600 in FIG. 16. Means for receiving or obtaining may include the transceivers 354 and/or antenna(s) 352 of the UE 104 illustrated in FIG. 3 and/or transceiver 1608 and antenna 1610 of the communications device 1600 in FIG. 16.

FIG. 17 depicts aspects of an example communications device. In some aspects, communications device 1700 is a network entity, such as BS 102 described above with respect to FIGS. 1 and 3 or a disaggregated BS as described with respect to FIG. 2.

The communications device 1700 includes a processing system 1702 coupled to a transceiver 1708 (e.g., a transmitter and/or a receiver) and/or a network interface 1712. The transceiver 1708 is configured to transmit and receive signals for the communications device 1700 via an antenna 1710, such as the various signals as described herein. The network interface 1712 is configured to obtain and send signals for the communications device 1700 via communications link(s), such as a backhaul link, midhaul link, and/or fronthaul link as described herein, such as with respect to FIG. 2. The processing system 1702 may be configured to perform processing functions for the communications device 1700, including processing signals received and/or to be transmitted by the communications device 1700.

The processing system 1702 includes one or more processors 1720. In various aspects, one or more processors 1720 may be representative of one or more of receive processor 338, transmit processor 320, TX MIMO processor 330, and/or controller/processor 340, as described with respect to FIG. 3. The one or more processors 1720 are coupled to a computer-readable medium/memory 1730 via a bus 1706. In certain aspects, the computer-readable medium/memory 1730 is configured to store instructions (e.g., computer-executable code) that when executed by the one or more processors 1720, cause the one or more processors 1720 to perform the methods 1400 or 1500 described with respect to FIGS. 14 and 15, respectively, or any aspect related to them. Note that reference to a processor of communications device 1700 performing a function may include one or more processors of communications device 1700 performing that function.

In the depicted example, the computer-readable medium/memory 1730 stores code (e.g., executable instructions) for transmitting 1731, code for receiving 1732, and code for demultiplexing 1733, code for determining 1734, and code for deriving 1735. Processing of the code 1731-1733 may cause the communications device 1700 to perform the methods 1400 or 1500 described with respect to FIGS. 14 and 15, respectively, or any aspect related to them.

The one or more processors 1720 include circuitry configured to implement (e.g., execute) the code stored in the computer-readable medium/memory 1730, including circuitry for transmitting 1721, circuitry for receiving 1722, circuitry for demultiplexing 1723, circuitry for determining 1724, and circuitry for deriving 1725. Processing with circuitry 1721-1723 may cause the communications device 1700 to perform the methods 1400 or 1500 as described with respect to FIGS. 14 and 15, respectively, or any aspect related to them.

Various components of the communications device 1700 may provide means for performing the methods 1400 or 1500 as described with respect to FIGS. 14 and 15, respectively, or any aspect related to them. Means for transmitting, sending or outputting for transmission may include the transceivers 332 and/or antenna(s) 334 of the BS 102 illustrated in FIG. 3 and/or transceiver 1708 and antenna 1710 of the communications device 1700 in FIG. 17. Means for receiving or obtaining may include the transceivers 332 and/or antenna(s) 334 of the BS 102 illustrated in FIG. 3 and/or transceiver 1708 and antenna 1710 of the communications device 1700 in FIG. 17.

EXAMPLE CLAUSES

Implementation examples are described in the following numbered clauses:

Clause 1: A method for wireless communication by a user equipment (UE), comprising: receiving scheduling information from a network entity, wherein: the scheduling information schedules, in a first full duplex (FD) slot of a plurality of slots, transmission of a first uplink (UL) data channel repetition of a plurality of UL data channel repetitions and uplink control information (UCI), and the FD slot comprises an UL subband for UL transmissions and a downlink (DL) subband for DL transmissions; multiplexing the first UL data channel repetition with the UCI to form a multiplexed transmission; and transmitting the multiplexed transmission in the FD slot.

Clause 2: The method of Clause 1, wherein multiplexing the first UL data channel repetition with the UCI to form the multiplexed transmission for transmission in the FD slot is based on one or more offset values, associated with a non-FD slot of the plurality of slots, used for determining a number of resource elements (REs) for multiplexing the UCI in the first UL data channel repetition.

Clause 3: The method of Clause 2, further comprising determining the number of REs for multiplexing the UCI based on the one or more offset values associated with the non-FD slot, wherein multiplexing the first UL data channel repetition with the UCI comprises multiplexing the determined number of REs for the UCI with the first UL data channel repetition to form the multiplexed transmission.

Clause 4: The method of Clause 3, wherein determining the number of REs for multiplexing the UCI is based further on a total number of REs associated with the UL subband of the FD slot and a bandwidth associated with the first UL data channel repetition.

Clause 5: The method of Clause 4, wherein each of the one or more offset values is associated with a different type of information in the UCI.

Clause 6: The method of Clause 5, further comprising omitting at least a portion a first type of information in the UCI from being multiplexed with the first UL data channel repetition when, based on the total number of REs associated with the UL subband of the FD slot and a number of REs associated with the first type of information, the UL subband of the FD slot does not include enough REs for the portion of the first type of information.

Clause 7: The method of Clause 6, wherein omitting the portion of the first type of information is based on a priority level associated with this portion of the first type of information.

Clause 8: The method of Clause 1, wherein: multiplexing the first UL data channel repetition with the UCI to form the multiplexed transmission for transmission in the FD slot is based on a first set of offset values used for determining a number of resource elements (REs) for multiplexing the UCI in the first UL data channel repetition, and the first set of offset values are associated with the FD slot and are different from a second set of offset values associated with non-FD slots.

Clause 9: The method of Clause 8, wherein the first set of offset values associated with the first FD slot includes different offset values for different types of information in the UCI.

Clause 10: The method of Clause 8, wherein: the first set of offset values associated with the FD slot depend on a total number of resource element (REs) of the UL subband of the FD slot, and the second set of offset values associated with the non-FD slots depend on a total number of REs an UL subband of the non-FD slots.

Clause 11: The method of any of Clauses 8-10, further comprising determining the number of REs for multiplexing the UCI based on the first set of offset values associated with the FD slot, wherein multiplexing the first UL data channel repetition with the UCI comprises multiplexing the determined number of REs for the UCI with the first UL data channel repetition to form the multiplexed transmission.

Clause 12: The method of Clause 11, wherein determining the number of REs for multiplexing the UCI is based further on a total number of REs associated an UL subband of a non-FD slot.

Clause 13: The method of Clause 11, wherein determining the number of REs for multiplexing the UCI is based further on an adjustment factor that limits the number of REs available for the UCI in the first FD slot.

Clause 14: The method of any of Clauses 8-13, wherein: the scheduling information comprises a first type of configured grant received via radio resource control (RRC) signaling from the network entity, and the method further comprising receiving the first set of offset values and the second set of offset values via the RRC signaling from the network entity.

Clause 15: The method of any of Clauses 8-13, wherein one of: the scheduling information comprises a second type of configured grant received in downlink control information (DCI) via a physical downlink control channel (PDCCH) from the network entity, or the scheduling information comprises a dynamic grant received in downlink control information (DCI) via a physical downlink control channel (PDCCH) from the network entity.

Clause 16: The method of Clause 15, wherein the DCI further includes one of the first set of offset values or the second set of offset values associated with the non-FD slots.

Clause 17: The method of Clause 15, wherein: the DCI further includes the second set of offset values associated with the non-FD slots, and the method further comprises deriving the first set of offset values associated with the FD slot based on the second set of offset values associated with the non-FD slots and one or more rules in a wireless standard.

Clause 18: The method of Clause 15, wherein: the DCI further includes the second set of offset values associated with the non-FD slots, and the method further comprises: receiving a delta value via radio resource control (RRC) signaling from the network entity, and deriving the first set of offset values associated with the FD slot by applying the delta value to offset values in the second set of offset values associated with the non-FD slots.

Clause 19: The method of Clause 15, wherein the DCI further includes the first set of offset values associated with the FD slot and the second set of offset values associated with the non-FD slots.

Clause 20: The method of Clause 19, wherein the DCI indicates the first set of offset values associated with the FD slot and the second set of offset values associated with the non-FD slots via more than two bits.

Clause 21: A method for wireless communication by a user equipment (UE), comprising: receiving scheduling information from a network entity, wherein: the scheduling information schedules transmission of a first uplink (UL) data channel repetition of a plurality of UL data channel repetitions and uplink control information (UCI), and the first UL data channel repetition is scheduled to extend across a slot boundary between a first slot of a plurality of slots and a second slot of the plurality of slots such that a first portion of the first UL data channel repetition is scheduled to occur in the first slot and a second portion of the first UL data channel repetition is scheduled to occur in the second slot; taking one or more actions related to multiplexing the UCI with the first UL data channel repetition, and transmitting, based on the one or more actions related to the multiplexing, at least the first UL data channel repetition.

Clause 22: The method of Clause 21, wherein taking the one or more actions related to the multiplexing the UCI with the first UL data channel repetition is based on a slot type associated with the first slot in which the first portion of the first UL data channel repetition is scheduled.

Clause 23: The method of Clause 22, wherein: the slot type associated with the first slot in which the first portion of the first UL data channel repetition is scheduled comprises a non-full duplex (FD) slot, and taking the one or more actions related to the multiplexing the UCI with the first UL data channel repetition comprises multiplexing the UCI with the first portion of the first UL data channel repetition based on the slot type associated with the first slot in which the first portion of the first UL data channel repetition is scheduled being the non-FD slot.

Clause 24: The method of Clause 23, wherein multiplexing the UCI with the first portion of the first UL data channel repetition is further based on one or more offset values, associated with the non-FD slot, used for determining a number of resource elements (REs) for multiplexing the UCI with the first portion of the first UL data channel repetition.

Clause 25: The method of Clause 24, wherein multiplexing the UCI with the first portion of the first UL data channel repetition further comprises: determining the number of REs for multiplexing the UCI based on the one or more offset values associated with the non-FD slot, a total number of REs associated with an UL subband of the first slot, and a bandwidth associated with the first UL data channel repetition, and multiplexing the determined number of REs for the UCI with the first portion of the first UL data channel repetition.

Clause 26: The method of Clause 22, wherein: the slot type associated with the first slot in which the first portion of the first UL data channel repetition is scheduled comprises a full duplex (FD) slot, and taking the one or more actions related to the multiplexing the UCI with the first UL data channel repetition is based further on at least one of a bandwidth associated with the first portion of the first UL data channel repetition or a total number of resources available in the first portion of the first UL data channel repetition for the UCI.

Clause 27: The method of Clause 26, wherein, when the bandwidth associated with the first portion of the first UL data channel repetition in the FD slot is greater than or equal to a threshold percentage of a bandwidth of a second UL data channel repetition in a non-FD slot: taking the one or more actions related to the multiplexing the UCI with the first UL data channel repetition comprises multiplexing the UCI with the first portion of the first UL data channel repetition in the FD slot, and transmitting at least the first UL data channel repetition comprises transmitting the UCI multiplexed with the first portion of the UL data channel repetition in the FD slot.

Clause 28: The method of Clause 27, wherein, when the bandwidth associated with the first portion of the first UL data channel repetition in the FD slot is less than the threshold percentage of a bandwidth of a second UL data channel repetition in a non-FD slot: taking the one or more actions related to the multiplexing the UCI with the first UL data channel repetition comprises not multiplexing the UCI with the first portion of the first UL data channel repetition in the FD slot, and transmitting at least the first UL data channel repetition comprises transmitting the first portion of the UL data channel repetition in the FD slot without the UCI.

Clause 29: The method of Clause 26, wherein, when the total number of resources available in the first portion of the first UL data channel repetition for the UCI is greater than or equal to a threshold number of resources: taking the one or more actions related to the multiplexing the UCI with the first UL data channel repetition comprises multiplexing the UCI with the first portion of the first UL data channel repetition in the FD slot, and transmitting at least the first UL data channel repetition comprises transmitting the UCI multiplexed with the first portion of the UL data channel repetition in the FD slot.

Clause 30: The method of Clause 29, wherein, when the total number of resources available in the first portion of the first UL data channel repetition for the UCI is less than the threshold number of resources: taking the one or more actions related to the multiplexing the UCI with the first UL data channel repetition comprises multiplexing the UCI with the first portion of the first UL data channel repetition in the FD slot, and transmitting at least the first UL data channel repetition comprises transmitting the UCI multiplexed with the first portion of the UL data channel repetition in the FD slot.

Clause 31: The method of Clause 29, wherein, when the total number of resources available in the first portion of the first UL data channel repetition for the UCI is less than the threshold number of resources: taking the one or more actions related to the multiplexing the UCI with the first UL data channel repetition comprises: splitting the UCI into a first portion and a second portion, and multiplexing the first portion of the UCI with the first portion of the first UL data channel repetition in the FD slot and multiplexing the second portion of the UCI with the second portion of the first UL data channel repetition in the second slot, and transmitting at least the first UL data channel repetition comprises transmitting the first portion of the UCI multiplexed with the first portion of the UL data channel repetition in the FD slot and transmitting the second portion of the UCI multiplexed with the second portion of the UL data channel repetition in the second slot.

Clause 32: The method of Clause 31, wherein: the first portion of the UCI includes hybrid automatic repeat request (HARQ) acknowledgement information, and the second portion of the UCI includes channel state information (CSI) feedback.

Clause 33: The method of Clause 31, wherein: the first portion of the UCI includes hybrid automatic repeat request (HARQ) acknowledgement information and a first part of channel state information (CSI) feedback, and the second portion of the UCI includes a second part of the CSI feedback.

Clause 34: The method of Clause 26, wherein, when the total number of resources available in the first portion of the first UL data channel repetition for the UCI is less than a number of resources available in the second portion of the first UL data channel repetition: taking the one or more actions related to the multiplexing the UCI with the first UL data channel repetition comprises multiplexing the UCI with the second portion of the first UL data channel repetition, and transmitting at least the first UL data channel repetition comprises transmitting the UCI multiplexed with the second portion of the first UL data channel repetition in the second slot.

Clause 35: The method of Clause 22, wherein: the slot type associated with the first slot in which the first portion of the first UL data channel repetition is scheduled comprises a full duplex (FD) slot, and the UCI includes at least a first portion including a first type of information and a second portion including a second type of information.

Clause 36: The method of Clause 35, wherein based on the FD slot in which the first portion of the first UL data channel repetition is scheduled, taking the one or more actions related to the multiplexing the UCI with the first UL data channel repetition comprises: omitting the second portion of the UCI including the second type of information from being multiplexed with the first portion of the first UL data channel repetition, and multiplexing the first portion of the UCI including the first type of information with the first portion of the first UL data channel repetition.

Clause 37: The method of Clause 35, further comprising determining a number of resources available for the UCI in the first portion of the first UL data channel repetition based on an adjustment factor.

Clause 38: The method of Clause 37, wherein the adjustment factor is unique to FD slots, including the FD slot in which the first portion of the first UL data channel repetition is scheduled, and is different from adjustment factors associated with non-FD slots.

Clause 39: The method of Clause 37, wherein the adjustment factor is unique to the second type of information of the UCI and to FD slots, including the FD slot in which the first portion of the first UL data channel repetition is scheduled, and is different from adjustment factors associated with non-FD slots and from adjustment factors associated with other types of information in the UCI.

Clause 40: The method of Clause 37, wherein: based on the adjustment factor, the number of resources available for the UCI in the first portion of the first UL data channel repetition is not sufficient for transmitting the second portion of the UCI in the first portion of the first UL data channel repetition, and taking the one or more actions related to the multiplexing the UCI with the first UL data channel repetition comprises: omitting the second portion of the UCI including the second type of information from being multiplexed with the first portion of the first UL data channel repetition, and multiplexing the first portion of the UCI including the first type of information with the first portion of the first UL data channel repetition.

Clause 41: The method of Clause 37, wherein: based on the adjustment factor, the number of resources available for the UCI in the first portion of the first UL data channel repetition is sufficient for transmitting the second portion of the UCI in the first portion of the first UL data channel repetition, and taking the one or more actions related to the multiplexing the UCI with the first UL data channel repetition comprises: multiplexing the first portion of the UCI including the first type of information and the second portion of the UCI including the second type of information with the first portion of the first UL data channel repetition.

Clause 42: The method of Clause 22, wherein: the slot type associated with the first slot in which the first portion of the first UL data channel repetition is scheduled comprises a full duplex (FD) slot, and taking one or more actions related to multiplexing the UCI with the first UL data channel repetition is based on one or more rules associated with latency requirements of different types of information included in the UCI.

Clause 43: The method of Clause 42, wherein: the UCI includes a first type of information associated with a first latency requirement and a second type of information associated with a second latency requirement, and the one or more rules specify that: the first type of information included in the UCI associated with the first latency requirement is permitted to be multiplexed with the first portion of the first UL data channel repetition in the FD slot, and the second type of information included in the UCI associated with the second latency requirement is not permitted to be multiplexed with the first UL data channel repetition in a FD slot.

Clause 44: The method of Clause 43, wherein taking one or more actions related to multiplexing the UCI with the first UL data channel repetition based on the one or more rules comprises: omitting the second type of information included in the UCI from being multiplexed with the first portion of the first UL data channel repetition in the FD slot, and multiplexing the first type of information included in the UCI with the first portion of the first UL data channel repetition in the FD slot.

Clause 45: The method of Clause 22, wherein: the slot type associated with the first slot in which the first portion of the first UL data channel repetition is scheduled comprises a full duplex (FD) slot, the UCI includes a first type of information, a second type of information, and a third type of information, and taking the one or more actions related to multiplexing the UCI with the first UL data channel repetition is based on one or more rules associated with different types of information included in the UCI.

Clause 46: The method of Clause 45, wherein the one or more rules specify that: the first type of information included in the UCI is permitted to be multiplexed with the first portion of the first UL data channel repetition in the FD slot, and the second type of information and third type of information included in the UCI associated are not permitted to be multiplexed with the first UL data channel repetition in the FD slot.

Clause 47: The method of Clause 46, wherein taking one or more actions related to multiplexing the UCI with the first UL data channel repetition based on the one or more rules comprises: omitting the second type of information and third type of information included in the UCI from being multiplexed with the first portion of the first UL data channel repetition in the FD slot, and multiplexing the first type of information included in the UCI with the first portion of the first UL data channel repetition in the FD slot.

Clause 48: The method of Clause 45, wherein the one or more rules specify that: the first type of information and the second type of information included in the UCI is permitted to be multiplexed with the first portion of the first UL data channel repetition in the FD slot, and the third type of information included in the UCI is not permitted to be multiplexed with the first UL data channel repetition in the FD slot.

Clause 49: The method of Clause 48, wherein taking one or more actions related to multiplexing the UCI with the first UL data channel repetition based on the one or more rules comprises: omitting the third type of information included in the UCI from being multiplexed with the first portion of the first UL data channel repetition in the FD slot, and multiplexing the first type of information and the second type of information included in the UCI with the first portion of the first UL data channel repetition in the FD slot.

Clause 50: A method for wireless communication by a network entity, comprising: transmitting scheduling information to a user equipment (UE), wherein: the scheduling information schedules, in a first full duplex (FD) slot of a plurality of slots, transmission of a first uplink (UL) data channel repetition of a plurality of UL data channel repetitions and uplink control information (UCI), and the FD slot comprises an UL subband for UL transmissions and a downlink (DL) subband for DL transmissions; receiving a multiplexed transmission in the FD slot, the multiplexed transmission comprising the first UL data channel repetition and the UCI; and demultiplexing the UCI from the multiplexed transmission.

Clause 51: The method of Clause 50, wherein demultiplexing the UCI from the multiplexed transmission is based on one or more offset values, associated with a non-FD slot of the plurality of slots, used for determining a number of resource elements (REs) for multiplexing the UCI in the first UL data channel repetition.

Clause 52: The method of Clause 51, further comprising determining the number of REs for multiplexing the UCI based on the one or more offset values associated with the non-FD slot, wherein demultiplexing the UCI from the multiplexed transmission comprises demultiplexing the determined number of REs for the UCI from the multiplexed transmission.

Clause 53: The method of Clause 52, wherein determining the number of REs for multiplexing the UCI is based further on a total number of REs associated with the UL subband of the FD slot and a bandwidth associated with the first UL data channel repetition.

Clause 54: The method of Clause 53, wherein each of the one or more offset values is associated with a different type of information in the UCI.

Clause 55: The method of Clause 54, further comprising determining a portion a first type of information in the UCI is omitted from the multiplexed transmission when, based on the total number of REs associated with the UL subband of the FD slot and a number of REs associated with the first type of information, the UL subband of the FD slot does not include enough REs for the portion of the first type of information.

Clause 56: The method of Clause 50, wherein: demultiplexing the UCI from the multiplexed transmission is based on a first set of offset values used for determining a number of resource elements (REs) for multiplexing the UCI in the first UL data channel repetition, and the first set of offset values are associated with the FD slot and are different from a second set of offset values associated with non-FD slots.

Clause 57: The method of Clause 56, wherein the first set of offset values associated with the first FD slot includes different offset values for different types of information in the UCI.

Clause 58: The method of Clause 56, wherein: the first set of offset values associated with the FD slot depend on a total number of resource element (REs) of the UL subband of the FD slot, and the second set of offset values associated with the non-FD slots depend on a total number of REs an UL subband of the non-FD slots.

Clause 59: The method of any of Clauses 56-58, further comprising determining the number of REs for multiplexing the UCI based on the first set of offset values associated with the FD slot, wherein demultiplexing the UCI from the multiplexed transmission comprises demultiplexing the determined number of REs for the UCI from the multiplexed transmission.

Clause 60: The method of Clause 59, wherein determining the number of REs for multiplexing the UCI is based further on a total number of REs associated with an UL subband of a non-FD slot.

Clause 61: The method of Clause 59, wherein determining the number of REs for multiplexing the UCI is based further on an adjustment factor that limits the number of REs available for the UCI in the first FD slot.

Clause 62: The method of any of Clauses 56-61, wherein: the scheduling information comprises a first type of configured grant transmitted via radio resource control (RRC) signaling to the UE, and the method further comprising transmitting the first set of offset values and the second set of offset values via the RRC signaling to the UE.

Clause 63: The method of any of Clauses 56-61, wherein one of: the scheduling information comprises a second type of configured grant transmitted in downlink control information (DCI) via a physical downlink control channel (PDCCH) to the UE, or the scheduling information comprises a dynamic grant transmitted in downlink control information (DCI) via a physical downlink control channel (PDCCH) to the UE.

Clause 64: The method of Clause 63, wherein the DCI further includes one of the first set of offset values or the second set of offset values associated with the non-FD slots.

Clause 65: The method of Clause 63, wherein: the DCI further includes the second set of offset values associated with the non-FD slots, and the method further comprises deriving the first set of offset values associated with the FD slot based on the second set of offset values associated with the non-FD slots and one or more rules in a wireless standard.

Clause 66: The method of Clause 63, wherein: the DCI further includes the second set of offset values associated with the non-FD slots, and the method further comprises: transmitting a delta value via radio resource control (RRC) signaling to the UE, and deriving the first set of offset values associated with the FD slot by applying the delta value to offset values in the second set of offset values associated with the non-FD slots.

Clause 67: The method of Clause 63, wherein the DCI further includes the first set of offset values associated with the FD slot and the second set of offset values associated with the non-FD slots.

Clause 68: The method of Clause 67, wherein the DCI indicates the first set of offset values associated with the FD slot and the second set of offset values associated with the non-FD slots via more than two bits.

Clause 69: A method for wireless communication by a network entity, comprising: transmitting scheduling information to a user equipment (UE), wherein: the scheduling information schedules transmission of a first uplink (UL) data channel repetition of a plurality of UL data channel repetitions and uplink control information (UCI), and the first UL data channel repetition is scheduled to extend across a slot boundary between a first slot of a plurality of slots and a second slot of the plurality of slots such that a first portion of the first UL data channel repetition is scheduled to occur in the first slot and a second portion of the first UL data channel repetition is scheduled to occur in the second slot; receiving a multiplexed transmission in the first slot or the second slot, the multiplexed transmission comprising at least the first UL data channel repetition and the UCI, and demultiplexing the UCI from the multiplexed transmission.

Clause 70: The method of Clause 69, wherein demultiplexing the UCI from the multiplexed transmission is based on a slot type associated with the first slot in which the first portion of the first UL data channel repetition is scheduled.

Clause 71: The method of Clause 70, wherein: the slot type associated with the first slot in which the first portion of the first UL data channel repetition is scheduled comprises a non-full duplex (FD) slot, and demultiplexing the UCI from the multiplexed transmission comprises demultiplexing the UCI from the multiplexed transmission based on the slot type associated with the first slot in which the first portion of the first UL data channel repetition is scheduled being the non-FD slot.

Clause 72: The method of Clause 71, wherein demultiplexing the UCI from the multiplexed transmission is further based on one or more offset values, associated with the non-FD slot, used for determining a number of resource elements (REs) for multiplexing the UCI with the first portion of the first UL data channel repetition.

Clause 73: The method of Clause 72, wherein demultiplexing the UCI from the multiplexed transmission further comprises: determining the number of REs for multiplexing the UCI based on the one or more offset values associated with the non-FD slot, a total number of REs associated with an UL subband of the first slot, and a bandwidth associated with the first UL data channel repetition, and demultiplexing the determined number of REs for the UCI from the multiplexed transmission.

Clause 74: The method of Clause 70, wherein: the slot type associated with the first slot in which the first portion of the first UL data channel repetition is scheduled comprises a full duplex (FD) slot, and demultiplexing the UCI from the multiplexed transmission is based further on at least one of a bandwidth associated with the first portion of the first UL data channel repetition or a total number of resources available in the first portion of the first UL data channel repetition for the UCI.

Clause 75: The method of Clause 74, wherein, when the bandwidth associated with the first portion of the first UL data channel repetition in the FD slot is greater than or equal to a threshold percentage of a bandwidth of a second UL data channel repetition in a non-FD slot: demultiplexing the UCI from the multiplexed transmission comprises demultiplexing the UCI from the multiplexed transmission in the FD slot, and receiving the multiplexed transmission comprises receiving the multiplexed transmission in the FD slot.

Clause 76: The method of Clause 75, wherein, when the bandwidth associated with the first portion of the first UL data channel repetition in the FD slot is less than the threshold percentage of a bandwidth of a second UL data channel repetition in a non-FD slot: demultiplexing the UCI from the multiplexed transmission comprises demultiplexing the UCI from the multiplexed transmission in the non-FD slot, and receiving the multiplexed transmission comprises receiving the multiplexed transmission in the non-FD slot.

Clause 77: The method of Clause 74, wherein, when the total number of resources available in the first portion of the first UL data channel repetition for the UCI is greater than or equal to a threshold number of resources: demultiplexing the UCI from the multiplexed transmission comprises demultiplexing the UCI from the multiplexed transmission in the FD slot, and receiving the multiplexed transmission comprises receiving the multiplexed transmission in the FD slot.

Clause 78: The method of Clause 77, wherein, when the total number of resources available in the first portion of the first UL data channel repetition for the UCI is less than the threshold number of resources: demultiplexing the UCI from the multiplexed transmission comprises demultiplexing the UCI from the multiplexed transmission in the FD slot, and receiving the multiplexed transmission comprises receiving the multiplexed transmission in the FD slot.

Clause 79: The method of Clause 77, wherein, when the total number of resources available in the first portion of the first UL data channel repetition for the UCI is less than the threshold number of resources: demultiplexing the UCI from the multiplexed transmission comprises: demultiplexing a first portion of the UCI from the first portion of the first UL data channel repetition in the FD slot and demultiplexing a second portion of the UCI from the second portion of the first UL data channel repetition in the second slot, and receiving the multiplexed transmission comprises receiving the first portion of the UL data channel repetition in the FD slot and receiving the second portion of the UL data channel repetition in the second slot.

Clause 80: The method of Clause 79, wherein: the first portion of the UCI includes hybrid automatic repeat request (HARQ) acknowledgement information, and the second portion of the UCI includes channel state information (CSI) feedback.

Clause 81: The method of Clause 79, wherein: the first portion of the UCI includes hybrid automatic repeat request (HARQ) acknowledgement information and a first part of channel state information (CSI) feedback, and the second portion of the UCI includes a second part of the CSI feedback.

Clause 82: The method of Clause 74, wherein, when the total number of resources available in the first portion of the first UL data channel repetition for the UCI is less a number of resources available in the second portion of the first UL data channel repetition: demultiplexing the UCI from the multiplexed transmission comprises demultiplexing the UCI from the second portion of the first UL data channel repetition, and receiving the multiplexed transmission comprises receiving the multiplexed transmission in the second slot.

Clause 83: The method of Clause 70, wherein: the slot type associated with the first slot in which the first portion of the first UL data channel repetition is scheduled comprises a full duplex (FD) slot, and the UCI includes at least a first portion including a first type of information and a second portion including a second type of information.

Clause 84: The method of Clause 83, wherein based on the FD slot in which the first portion of the first UL data channel repetition is scheduled, demultiplexing the UCI from the multiplexed transmission comprises: demultiplexing the first portion of the UCI including the first type of information from the first portion of the first UL data channel repetition.

Clause 85: The method of Clause 83, further comprising determining a number of resources available for the UCI in the first portion of the first UL data channel repetition based on an adjustment factor.

Clause 86: The method of Clause 85, wherein the adjustment factor is unique to FD slots, including the FD slot in which the first portion of the first UL data channel repetition is scheduled, and is different from adjustment factors associated with non-FD slots.

Clause 87: The method of Clause 85, wherein the adjustment factor is unique to the second type of information of the UCI and to FD slots, including the FD slot in which the first portion of the first UL data channel repetition is scheduled, and is different from adjustment factors associated with non-FD slots and from adjustment factors associated with other types of information in the UCI.

Clause 88: The method of Clause 85, wherein: based on the adjustment factor, the number of resources available for the UCI in the first portion of the first UL data channel repetition is not sufficient for transmitting the second portion of the UCI in the first portion of the first UL data channel repetition, and demultiplexing the UCI from the multiplexed transmission comprises: demultiplexing the first portion of the UCI including the first type of information from the first portion of the first UL data channel repetition.

Clause 89: The method of Clause 85, wherein: based on the adjustment factor, the number of resources available for the UCI in the first portion of the first UL data channel repetition is sufficient for transmitting the second portion of the UCI in the first portion of the first UL data channel repetition, and demultiplexing the UCI from the multiplexed transmission comprises: demultiplexing the first portion of the UCI including the first type of information and the second portion of the UCI including the second type of information from the first portion of the first UL data channel repetition.

Clause 90: The method of Clause 70, wherein: the slot type associated with the first slot in which the first portion of the first UL data channel repetition is scheduled comprises a full duplex (FD) slot, and demultiplexing the UCI from the multiplexed transmission is based on one or more rules associated with latency requirements of different types of information included in the UCI.

Clause 91: The method of Clause 90, wherein: the UCI includes a first type of information associated with a first latency requirement and a second type of information associated with a second latency requirement, and the one or more rules specify that: the first type of information included in the UCI associated with the first latency requirement is permitted to be multiplexed with the first portion of the first UL data channel repetition in the FD slot, and the second type of information included in the UCI associated with the second latency requirement is not permitted to be multiplexed with the first UL data channel repetition in a FD slot.

Clause 92: The method of Clause 91, wherein demultiplexing the UCI from the multiplexed transmission based on the one or more rules comprises: demultiplexing the first type of information included in the UCI with the first portion of the first UL data channel repetition in the FD slot.

Clause 93: The method of Clause 70, wherein: the slot type associated with the first slot in which the first portion of the first UL data channel repetition is scheduled comprises a full duplex (FD) slot, the UCI includes a first type of information, a second type of information, and a third type of information, and demultiplexing the UCI from the multiplexed transmission is based on one or more rules associated with different types of information included in the UCI.

Clause 94: The method of Clause 93, wherein the one or more rules specify that: the first type of information included in the UCI is permitted to be multiplexed with the first portion of the first UL data channel repetition in the FD slot, and the second type of information and third type of information included in the UCI associated are not permitted to be multiplexed with the first UL data channel repetition in the FD slot.

Clause 95: The method of Clause 94, wherein demultiplexing the UCI from the multiplexed transmission based on the one or more rules comprises: demultiplexing the first type of information included in the UCI from the first portion of the first UL data channel repetition in the FD slot.

Clause 96: The method of Clause 93, wherein the one or more rules specify that: the first type of information and the second type of information included in the UCI is permitted to be multiplexed with the first portion of the first UL data channel repetition in the FD slot, and the third type of information included in the UCI is not permitted to be multiplexed with the first UL data channel repetition in the FD slot.

Clause 97: The method of Clause 96, wherein demultiplexing the UCI from the multiplexed transmission based on the one or more rules comprises: demultiplexing the first type of information and the second type of information included in the UCI from the first portion of the first UL data channel repetition in the FD slot.

Clause 98: An apparatus, comprising: a memory comprising executable instructions; and a processor configured to execute the executable instructions and cause the apparatus to perform a method in accordance with any one of Clauses 1-97.

Clause 99: An apparatus, comprising means for performing a method in accordance with any one of Clauses 1-97.

Clause 100: A non-transitory computer-readable medium comprising executable instructions that, when executed by a processor of an apparatus, cause the apparatus to perform a method in accordance with any one of Clauses 1-97.

Clause 101: A computer program product embodied on a computer-readable storage medium comprising code for performing a method in accordance with any one of Clauses 1-97.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), the method comprising:
receiving scheduling information from a network entity, wherein:
the scheduling information schedules transmission of a plurality of uplink (UL) data channel repetitions in a plurality of slots including a full duplex (FD) slot;
the scheduling information schedules a physical uplink control channel (PUCCH) overlapping at least a first UL data channel repetition of the plurality of UL data channel repetitions in the FD slot; and
the FD slot comprises an UL subband for UL transmissions and a downlink (DL) subband for DL transmissions;
multiplexing uplink control information (UCI) with the first UL data channel repetition in the FD slot to form a multiplexed transmission, wherein multiplexing the first UL data channel repetition with the UCI to form the multiplexed transmission for transmission in the FD slot is based on one or more offset values, associated with a non-FD slot of the plurality of slots, used for determining a number of resource elements (REs) for multiplexing the UCI in the first UL data channel repetition; and
transmitting the multiplexed transmission in the FD slot.

2. The method of claim 1, further comprising determining the number of REs for multiplexing the UCI based on the one or more offset values associated with the non-FD slot, wherein multiplexing the first UL data channel repetition with the UCI comprises multiplexing the determined number of REs for the UCI with the first UL data channel repetition to form the multiplexed transmission.

3. The method of claim 2, wherein determining the number of REs for multiplexing the UCI is based further on a total number of REs associated with the UL subband of the FD slot and a bandwidth associated with the first UL data channel repetition.

4. The method of claim 3, wherein each of the one or more offset values is associated with a different type of information in the UCI.

5. The method of claim 4, further comprising omitting at least a portion of a first type of information in the UCI from being multiplexed with the first UL data channel repetition when, based on the total number of REs associated with the UL subband of the FD slot and a number of REs associated with the first type of information, the UL subband of the FD slot does not include enough REs for the portion of the first type of information.

6. The method of claim 5, wherein omitting the at least the portion of the first type of information is based on a priority level associated with the at least the portion of the first type of information.

7. An apparatus, comprising:
memory comprising executable instructions; and
one or more processors configured to, individually or collectively, execute the executable instructions and cause the apparatus to:
receive scheduling information from a network entity, wherein:
the scheduling information schedules transmission of a plurality of uplink (UL) data channel repetitions in a plurality of slots including a full duplex (FD) slot;
the scheduling information schedules a physical uplink control channel (PUCCH) overlapping at least a first UL data channel repetition of the plurality of UL data channel repetitions in the FD slot; and
the FD slot comprises an UL subband for UL transmissions and a downlink (DL) subband for DL transmissions;
multiplex uplink control information (UCI) with the first UL data channel repetition in the FD slot to form a multiplexed transmission, wherein multiplexing the first UL data channel repetition with the UCI to form the multiplexed transmission for transmission in the FD slot is based on one or more offset values, associated with a non-FD slot of the plurality of slots, used for determining a number of resource elements (REs) for multiplexing the UCI in the first UL data channel repetition; and
transmit the multiplexed transmission in the FD slot.

8. The apparatus of claim 7, wherein the one or more processors are further configured to, individually or collectively, cause the apparatus to:
determine the number of REs for multiplexing the UCI based on the one or more offset values associated with the non-FD slot; and
in order to multiplex the first UL data channel repetition with the UCI, multiplex the determined number of REs for the UCI with the first UL data channel repetition to form the multiplexed transmission.

9. The apparatus of claim 8, wherein the one or more processors are configured to, individually or collectively, cause the apparatus to determine the number of REs for multiplexing the UCI based further on a total number of REs associated with the UL subband of the FD slot and a bandwidth associated with the first UL data channel repetition.

10. The apparatus of claim 9, wherein each of the one or more offset values is associated with a different type of information in the UCI.

11. The apparatus of claim 10, wherein the one or more processors are configured to, individually or collectively, cause the apparatus to omit at least a portion of a first type of information in the UCI from being multiplexed with the first UL data channel repetition when, based on the total number of REs associated with the UL subband of the FD slot and a number of REs associated with the first type of information, the UL subband of the FD slot does not include enough REs for the at least the portion of the first type of information.

12. The apparatus of claim 11, wherein the one or more processors are configured to, individually or collectively, cause the apparatus to omit the portion of the first type of information based on a priority level associated with the at least the portion of the first type of information.

13. A non-transitory computer readable medium storing computer executable code for wireless communication by a user equipment (UE), the computer executable code comprising:
code for receiving scheduling information from a network entity, wherein:
the scheduling information schedules transmission of a plurality of uplink (UL) data channel repetitions in a plurality of slots including a full duplex (FD) slot;
the scheduling information schedules a physical uplink control channel (PUCCH) overlapping at least a first UL data channel repetition of the plurality of UL data channel repetitions in the FD slot; and the FD slot comprises an UL subband for UL transmissions and a downlink (DL) subband for DL transmissions;

code for multiplexing uplink control information (UCI) with the first UL data channel repetition in the FD slot to form a multiplexed transmission, wherein multiplexing the first UL data channel repetition with the UCI to form the multiplexed transmission for transmission in the FD slot is based on one or more offset values, associated with a non-FD slot of the plurality of slots, used for determining a number of resource elements (REs) for multiplexing the UCI in the first UL data channel repetition; and code for transmitting the multiplexed transmission in the FD slot.

14. The non-transitory computer readable medium of claim 13, further comprising code for determining the number of REs for multiplexing the UCI based on the one or more offset values associated with the non-FD slot, wherein multiplexing the first UL data channel repetition with the UCI comprises multiplexing the determined number of REs for the UCI with the first UL data channel repetition to form the multiplexed transmission.

15. The non-transitory computer readable medium of claim 14, wherein determining the number of REs for multiplexing the UCI is based further on a total number of REs associated with the UL subband of the FD slot and a bandwidth associated with the first UL data channel repetition.

16. The non-transitory computer readable medium of claim 15, wherein each of the one or more offset values is associated with a different type of information in the UCI.

17. The non-transitory computer readable medium of claim 16, further comprising code for omitting at least a portion of a first type of information in the UCI from being multiplexed with the first UL data channel repetition when, based on the total number of REs associated with the UL subband of the FD slot and a number of REs associated with the first type of information, the UL subband of the FD slot does not include enough REs for the at least the portion of the first type of information.

18. The non-transitory computer readable medium of claim 17, wherein omitting the at least the portion of the first type of information is based on a priority level associated with the at least the portion of the first type of information.

19. An apparatus for wireless communication, the apparatus comprising:

means for receiving scheduling information from a network entity, wherein:

the scheduling information schedules transmission of a plurality of uplink (UL) data channel repetitions in a plurality of slots including a full duplex (FD) slot;

the scheduling information schedules a physical uplink control channel (PUCCH) overlapping at least a first UL data channel repetition of the plurality of UL data channel repetitions in the FD slot; and the FD slot comprises an UL subband for UL transmissions and a downlink (DL) subband for DL transmissions;

means for multiplexing uplink control information (UCI) with the first UL data channel repetition in the FD slot to form a multiplexed transmission, wherein the means for multiplexing the first UL data channel repetition with the UCI to form the multiplexed transmission for transmission in the FD slot is based on one or more offset values, associated with a non-FD slot of the plurality of slots, used for determining a number of resource elements (REs) for multiplexing the UCI in the first UL data channel repetition; and means for transmitting the multiplexed transmission in the FD slot.

20. The apparatus of claim 19, further comprising means for determining the number of REs for multiplexing the UCI based on the one or more offset values associated with the non-FD slot, wherein the means for multiplexing the first UL data channel repetition with the UCI comprises means for multiplexing the determined number of REs for the UCI with the first UL data channel repetition to form the multiplexed transmission.

21. The apparatus of claim 20, wherein the means for determining the number of REs for multiplexing the UCI is based further on a total number of REs associated with the UL subband of the FD slot and a bandwidth associated with the first UL data channel repetition.

22. The apparatus of claim 21, wherein each of the one or more offset values is associated with a different type of information in the UCI.

23. The apparatus of claim 22, further comprising means for omitting at least a portion of a first type of information in the UCI from being multiplexed with the first UL data channel repetition when, based on the total number of REs associated with the UL subband of the FD slot and a number of REs associated with the first type of information, the UL subband of the FD slot does not include enough REs for the at least the portion of the first type of information.

24. The apparatus of claim 23, wherein the means for omitting the at least the portion of the first type of information is based on a priority level associated with the at least the portion of the first type of information.

* * * * *